(12) United States Patent
Vegesna

(10) Patent No.: US 12,547,641 B2
(45) Date of Patent: *Feb. 10, 2026

(54) ENTITY INTERACTION INSTANCES

(71) Applicant: Zoho Corporation Private Limited, Chengalpattu Taluk (IN)

(72) Inventor: Ramakrishna Raju Vegesna, Austin, TX (US)

(73) Assignee: Zoho Corporation Private Limited, Chengalpattu Taluk (IN)

( * ) Notice: Subject to any disclaimer, the term of this patent is extended or adjusted under 35 U.S.C. 154(b) by 0 days.

This patent is subject to a terminal disclaimer.

(21) Appl. No.: 18/789,173

(22) Filed: Jul. 30, 2024

(65) Prior Publication Data

US 2025/0036655 A1    Jan. 30, 2025

Related U.S. Application Data

(63) Continuation of application No. 18/117,791, filed on Mar. 6, 2023, now Pat. No. 12,050,624.
(Continued)

(30) Foreign Application Priority Data

Mar. 18, 2022 (IN) .............................. 202241015002

(51) Int. Cl.
*G06F 16/28*     (2019.01)
*G06Q 10/0631*   (2023.01)

(52) U.S. Cl.
CPC ....... *G06F 16/282* (2019.01); *G06Q 10/0631* (2013.01)

(58) Field of Classification Search
CPC .......................... G06F 16/282; G06Q 10/0631
See application file for complete search history.

(56) References Cited

U.S. PATENT DOCUMENTS

2002/0173295 A1   11/2002   Nykanen
2011/0016417 A1    1/2011   Shiplacoff
(Continued)

FOREIGN PATENT DOCUMENTS

WO    2017137246    8/2017

*Primary Examiner* — Van H Oberly
*Assistant Examiner* — Kweku William Halm
(74) *Attorney, Agent, or Firm* — Ahmann Kloke LLP

(57) ABSTRACT

An entity-centric approach has been proposed to provide a consistent user experience in accessing a unified software applications suite effortlessly. Entities are connected with one another. The entities and the connectivity between them are reflected in all three functional layers of 3-tier client-server architecture. Every entity has a set of attributes and each attribute represents a data item or record of a particular type. The data items or records are represented in the form of card(s) as determined by contextualization and access control engines. Interactions capture entity communications across the unified software suite. The entities can communicate or interact across various channels like mail, call, messages, webinar, etc. An interaction screen is provided with a set of cards, that include information about an interaction card and its associated contact cards. An interaction instance along with a corresponding originator and receiver entities are highlighted and connected with a connector.

22 Claims, 21 Drawing Sheets

Related U.S. Application Data

(60) Provisional application No. 63/341,309, filed on May 12, 2022.

(56) References Cited

U.S. PATENT DOCUMENTS

| | | |
|---|---|---|
| 2012/0323890 A1 | 12/2012 | Dixon |
| 2014/0100846 A1 | 4/2014 | Haine |
| 2014/0280609 A1 | 9/2014 | Averbeck |
| 2016/0234075 A1* | 8/2016 | Sirpal ................ G06F 3/04883 |
| 2017/0352673 A1 | 12/2017 | Lee |
| 2018/0246978 A1 | 8/2018 | Marcin |
| 2021/0248135 A1 | 8/2021 | Rigney |
| 2021/0303342 A1 | 9/2021 | Dunn |
| 2021/0342541 A1 | 11/2021 | Taylor |
| 2022/0309412 A1 | 9/2022 | Tomaselli |

\* cited by examiner

500

| UI Layer 502 | UI Process Component 508 | Customization Module 512 |
| | | UI Level ID Generator 514 |
| | | Design Element Creator 516 |
| | UI Component 510 | |
| Process Layer 504 | Contextual Module 518 | |
| | Access Control Module 520 | |
| | Logic Module 522 | |
| Data Layer 506 | Data Access Components 524 | |
| | Data Access Platform 526 | |

```
                                                    ┌─ 2100
                                                   ↙
                                            ┌─ 2102
                                           /
┌─────────────────────────────────────────────────────────────────────────┐
│ Determining context of a human agent represented as a first entity in an│
│ organizational graph that includes a plurality of entities, including   │
│ the first entity, at least conceptually as nodes connected to one       │
│ another directly or indirectly via relationship edges                   │
└─────────────────────────────────────────────────────────────────────────┘
                                            ┌─ 2104
                                           /
┌─────────────────────────────────────────────────────────────────────────┐
│ selecting a set of cards for display in an interaction screen based at  │
│ least in part on a relationship of the first entity with a first set of │
│ entities of the plurality of entities and relationships between the     │
│ first set of entities with one another, wherein cards of the set of     │
│ cards are respectively associated with entities of the first set of     │
│ entities                                                                │
└─────────────────────────────────────────────────────────────────────────┘
                                            ┌─ 2106
                                           /
┌─────────────────────────────────────────────────────────────────────────┐
│ determining one or more actions are available to the first entity in    │
│ association with an interaction card of the set of cards                │
└─────────────────────────────────────────────────────────────────────────┘
                                            ┌─ 2108
                                           /
┌─────────────────────────────────────────────────────────────────────────┐
│ providing the interaction screen with the set of cards, wherein at least│
│ one of the set of cards include an indication of at least one of the    │
│ relationships between the first set of entities with one another and    │
│ information about an interaction between at least two entities of the   │
│ first set of entities                                                   │
└─────────────────────────────────────────────────────────────────────────┘
                                            ┌─ 2110
                                           /
┌─────────────────────────────────────────────────────────────────────────┐
│ in response to a first input stimulus that serves to select the         │
│ interaction card, which can be characterized as the selected card when  │
│ selected, providing an actionable popover card that includes a first    │
│ action of the one or more actions as a selectable first graphical       │
│ element of the one or more graphical elements                           │
└─────────────────────────────────────────────────────────────────────────┘
                                            ┌─ 2112
                                           /
┌─────────────────────────────────────────────────────────────────────────┐
│ in response to a second input stimulus that serves to select the first  │
│ graphical element, carrying out a process, associated with the first    │
│ action, that is executed by an artificial agent of a unified software   │
│ suite, and that is either constrained by the relationship of the first  │
│ entity with a second entity of the at least two entities associated with│
│ the selected card or constrained by the relationship of the first entity│
│ with a third entity associated with the action                          │
└─────────────────────────────────────────────────────────────────────────┘

FIG. 21
```

ENTITY INTERACTION INSTANCES

CROSS-REFERENCE TO RELATED APPLICATIONS

The present application is a continuation of U.S. patent application Ser. No. 18/117,791 filed Mar. 6, 2023, now U.S. Pat. No. 12,050,624, which claims priority to Indian Provisional Patent Application No. 202241015002 filed Mar. 18, 2022 and U.S. Provisional Patent Application Ser. No. 63/341,309 filed May 12, 2022, each of which is incorporated herein by reference in its entirety.

BACKGROUND

A software application bundle can be a set of software applications for common productivity tasks. These software application bundles are application-centric or application-oriented. Each software application in the bundle may have a distinct User Interface (UI). This becomes painful as the user has to access multiple applications. The user may face an inconsistency when accessing one or more application from the bundle.

SUMMARY

Making use of an entity-centric paradigm that includes entity "nodes" connected to one another via relationship "edges" in an organizational graph addresses problems with app-centric approaches. A user, who is also represented as an entity in the organization graph, can readily navigate the organizational graph in accordance with their own relationships with target entities and the target entities' relationships with one another. Applications are moved to the background and are exposed in accordance with relevant context.

BRIEF DESCRIPTION OF THE DRAWINGS

FIG. 5 is a diagram of functional layers and components of an example of a unified software suite.

FIG. 17 is a screenshot of interaction trends by channel for an "employee" entity.

FIG. 21 is a flowchart of an example of handling an actionable popover in a unified software suite.

DETAILED DESCRIPTION

A unified software suite is a patchwork/bundle/collection of cloud applications, legacy tools, and other applications bundled together to transform an organization's disparate activities into a more connected and agile organization, thereby increasing productivity across the organization, delivering better customer experiences, and much more. It is apt to call it a "single operating system" for the organization. It acts as a powerful tool to pull data from various applications of the unified software suite and visualize them on a single screen thus providing valuable insights with respect to the organization. ZOHO ONE™ is an example of a system that bundles software applications like ZOHO Mail™, ZOHO CRM™, ZOHO Cliq®, ZOHO Books™, ZOHO Document™, etc.

A unified software suite functions poorly as a bundle of applications with an app-centric approach. Building a software application with an app-centric approach, is becoming complex as it not only monitors a set of hosts, it also has to monitor sources of data. In this paper, sources of data that are to be monitored are referred to as entities. A software application with "entity-centric" approach allows a user to connect to the data to understand increasingly complex and interdependent systems in the context of organizational operations. It's an improvement to "app-centric" in the unified software suite context because any complex modern software application has to deal with much more than just applications. Changing from the app-centric approach to an entity-centric approach is a solution. The unified software suite with an entity-centric approach provides a consistent user experience in accessing bundled software applications effortlessly.

An entity is used to model and manage data in a software application. Examples of entities for building such software application include accounts, contacts, employees, activities, etc. Every entity has a set of attributes and each attribute represents a data item or record of a particular type. For example, the "account" entity has attributes like name, address, etc. For instance, if an entity is implemented in a database table, the entity attributes may correspond to table columns.

Figure 1:
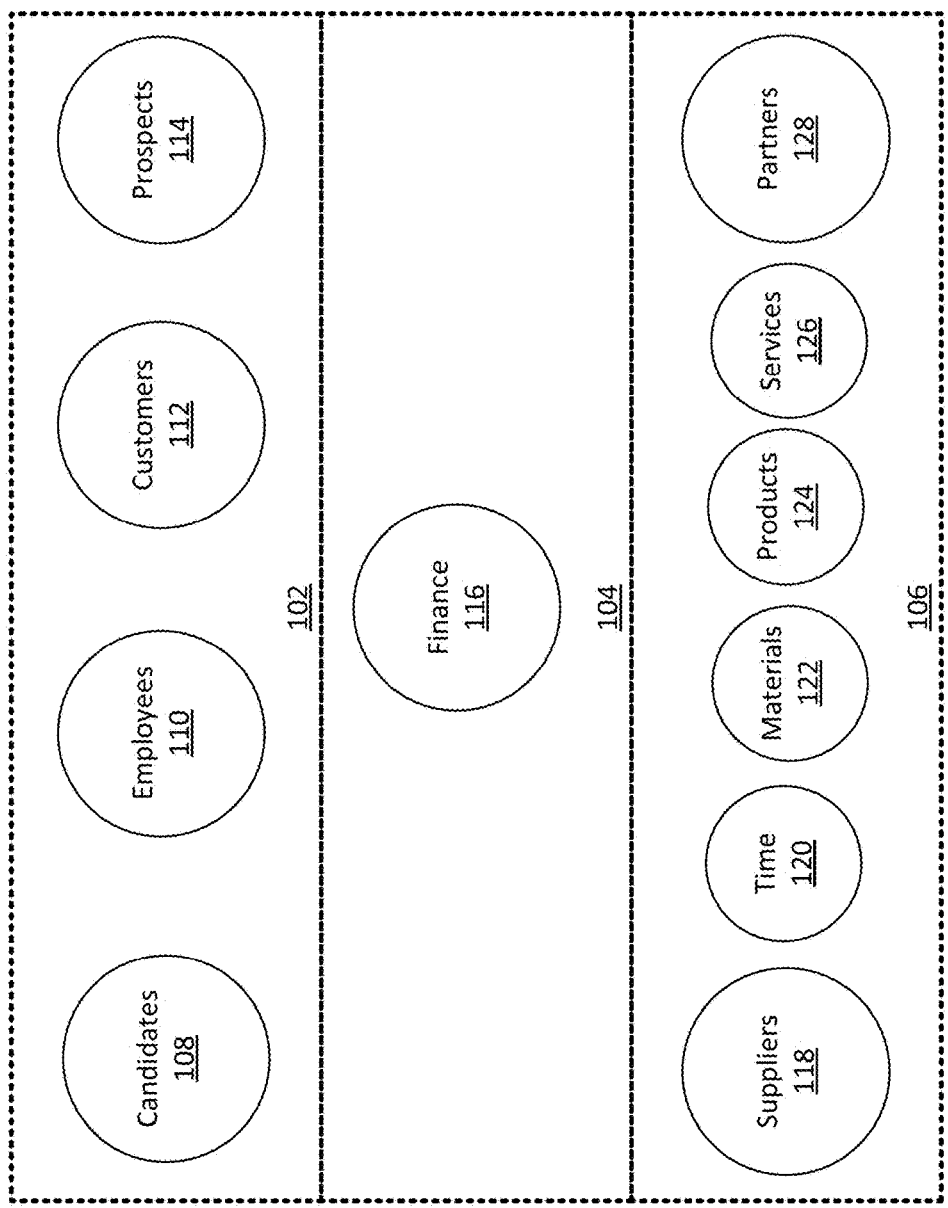
FIG. 1 is a diagram of essential entities for an example of a unified software suite.

FIG. 1 is a diagram 100 of essential entities for an example of a unified software suite. In this example, a consumer group 102 includes candidate entities 108, employee entities 110, customer entities 112, and prospect entities 114. The candidate entities 108 and prospect entities 114 feed into the employee entities 110 and customer entities 112. The deliverables group 106 includes supplier entities 118, time entities 120, material entities 122, product entities 124, service entities 126, and partner entities 128. Entities like the "prospects" and "customers" entities are consumers of "products" and "services" entities, which are offered/created using entities like "time" and "materials". The entities "products" and "services" are supplied through the "suppliers" entities, and sold through "partners" entities. The process is enabled by a finance entity 116 in a finance group 104. In a specific implementation, all these entities are reflected in an organizational graph by including a separate module for all these entities. Some of the entities, like "employees", "customers", "finance", "time", "materials", "products", and "services" are closely linked within an organization; the other entities are outside. In the example of FIG. 1, the "finance" entity is in the middle, but the central entity could be "customer" or some other entity selected by an administrator or user in accordance with their preferences or requirements.

Figure 2:
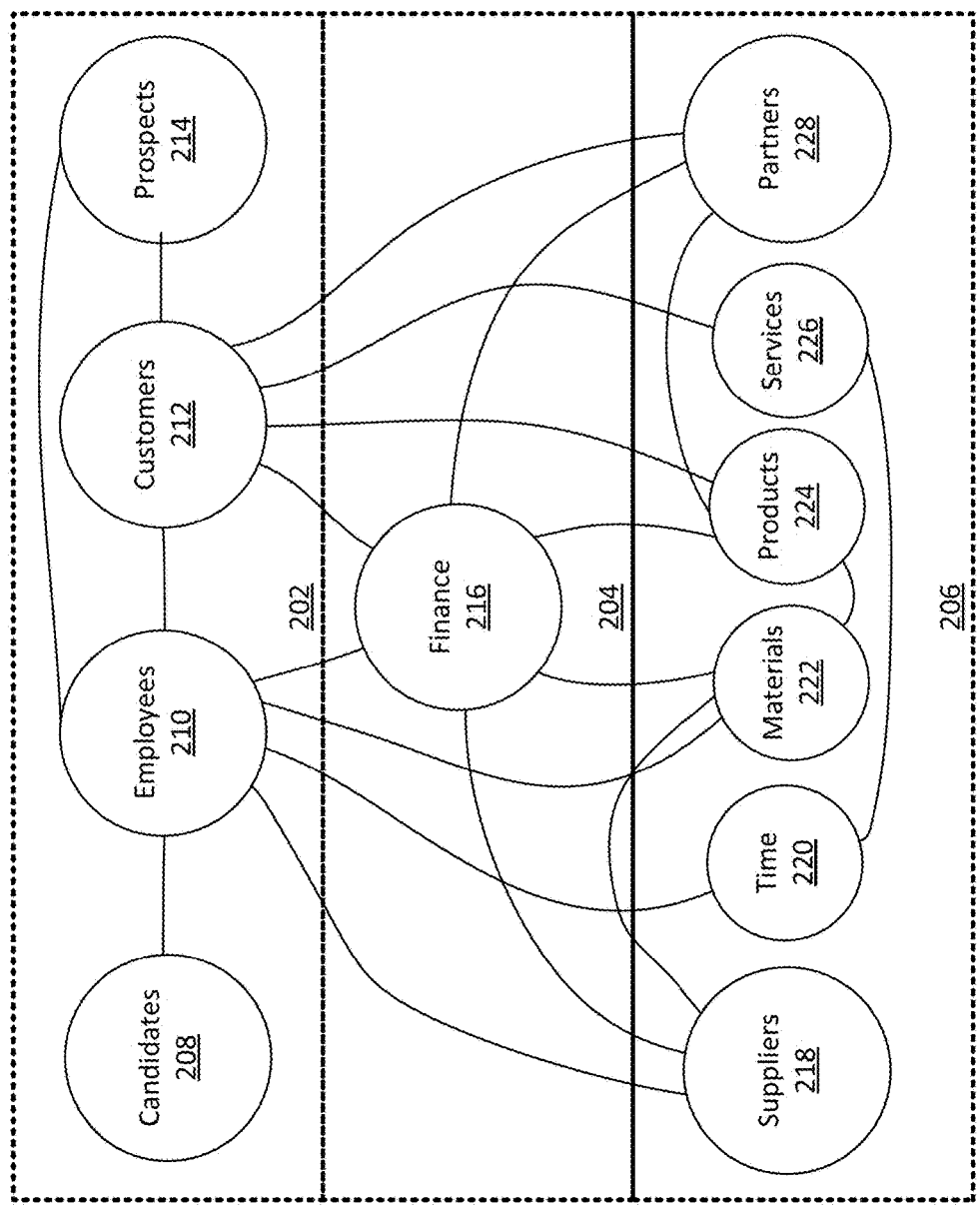
FIG. 2 is a diagram connections between entities of an example of a unified software suite.

FIG. 2 is a diagram 200 of connections between entities of an example of a unified software suite. The groups 202, 204, and 206 are equivalent to the groups 102, 104, 106. The entities 208-228 are equivalent to the entities 108-128. In a specific implementation, every entity is connected to all other entities in an organizational graph, either directly or indirectly.

Figure 3:
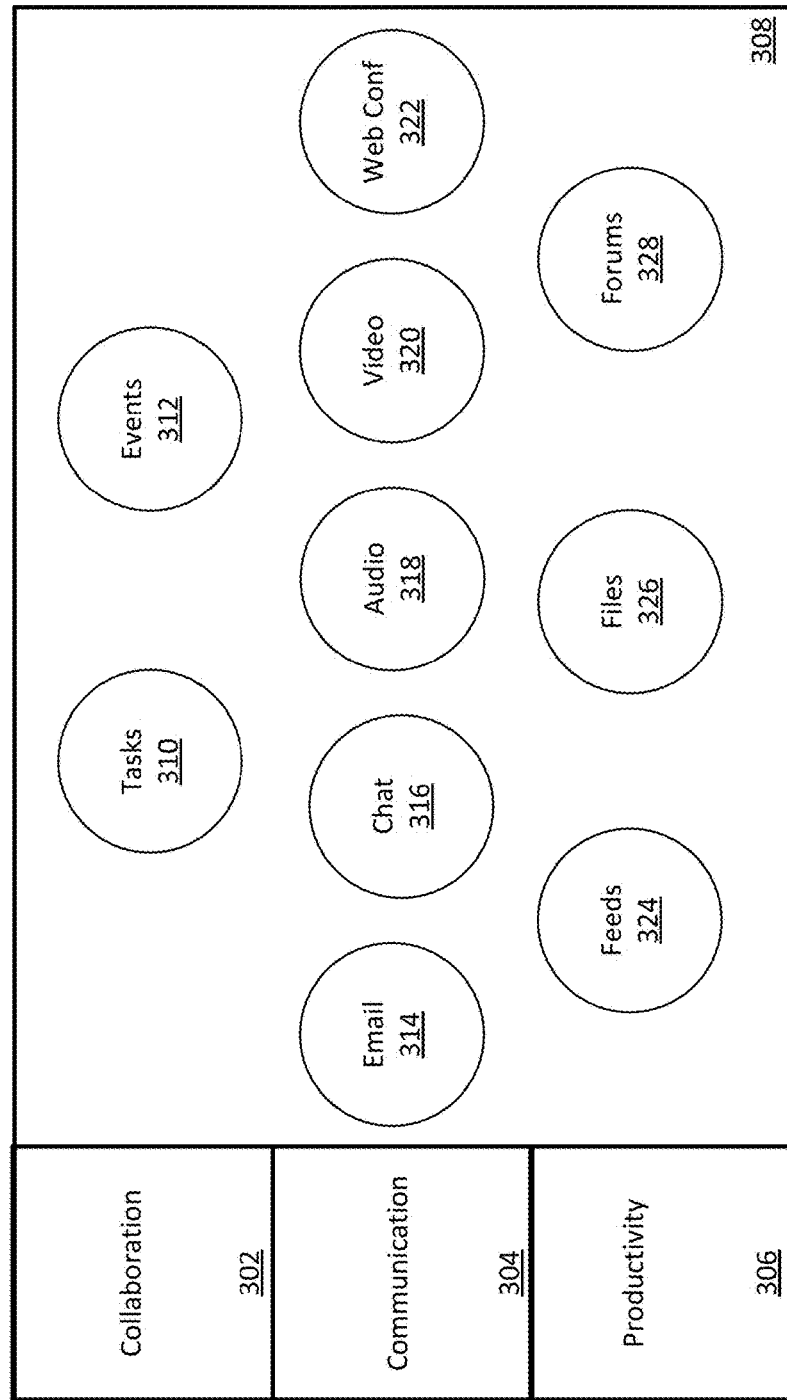
FIG. 3 is a diagram of examples of software applications of a unified software suite.

FIG. 3 is a diagram 300 of examples of software applications of a unified software suite. Several software applications could be deployed to realize the connection among entities of the unified software suite. These software applications broadly fall under three different contexts collaboration 302, communication 304, and productivity 306. Examples of software applications with communication context include email 314, chat 316, audio 318 (e.g., voice calls, audio recordings, meetings, and music, to name three examples), video 320 (e.g., video calls, video recordings, and graphical animations, to name three examples), web conference 322 (or, more generally, a meeting scheduled via a calendar application or for which the unified software suite has otherwise been notified, with or without a transcript, recording, or video recording of the meeting), etc. Examples of software applications with collaboration context include tasks 310, events 312, and workdrive-related applications, such as Customer Relationship Management (CRM), finance-books, projects, calendar, etc. Examples of software applications with productivity context includes feeds 324, files 326, and forums 328.

Software applications with communication context enable connection between or integration among entities through conversation, mail, chat, web meetings, etc. Communication is among one or more entities like "employees", "customers", "prospects", "suppliers", "partners" and "candidates". The communication among the entities is about one or more entities like "time", "material", "products", "service", and "finance". For instance, a communication between an "employee" entity and a "supplier" entity could be a conversation related to delayed payments to a "supplier". The conversation should include "finance" details in context. This uniquely enables bringing context to almost every conversation. Advantageously, understanding inter-connections can facilitate pre-enabling connections.

Figure 4:
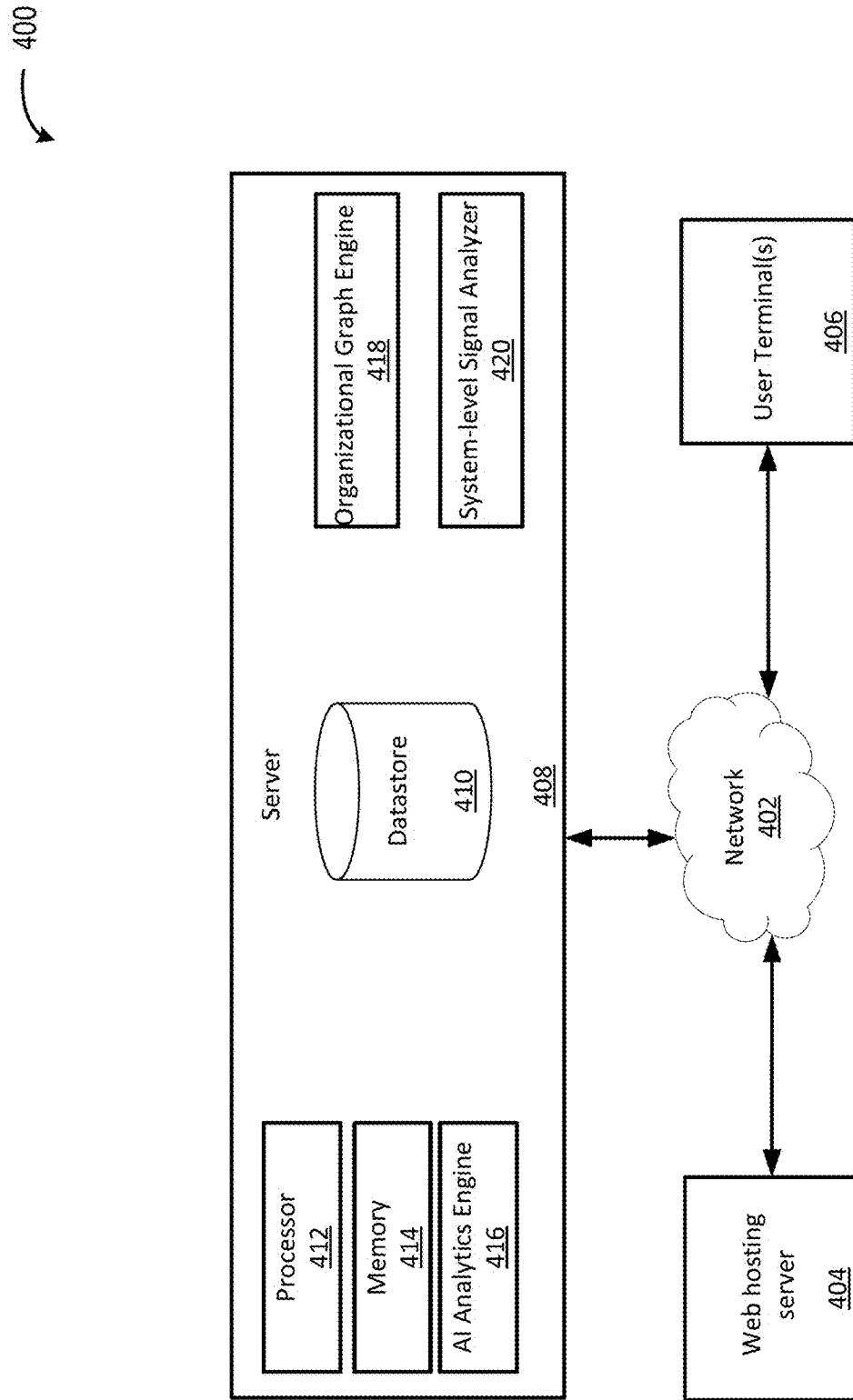
FIG. 4 is a block diagram of an example of an entity card utilization system.

FIG. 4 is a block diagram 400 of an example of an entity card utilization system. In this example, the system comprises an application server 408 connected to one or more user terminals 406 through the network 402 (e.g., the Internet) and a web hosting server 404 to host a unified software suite on the Internet.

The application server includes an Artificial Intelligence (AI) analytics engine 416, system-level signal analyzer 420, organizational graph engine 418, a processor 412, memory 414, and a datastore 410.

The system-level signal analyzer observes and collects signals (e.g., notifications like message, mail, payment, etc.) across the unified software suite, and stores them in the datastore.

Entities and connections between them are stored in the form of nodes and relationships respectively in an organizational graph in an organizational graph datastore. The organizational graph datastore is present in the data storage and, in this example, is flexible, dynamic, and easy to integrate into the unified software suite.

In a specific implementation, an organizational graph is created including a set of nodes that are connected or related to each other. Each node in the organizational graph represents an entity (e.g., a record or a data item belonging to an entity). Each node comprises a label or a tag to define the role of the entity in the organization. A relationship between two nodes refers to a connection (through software applications of any context namely communication, collaboration or productivity) between the two entities. Each relationship has a direction and name and is connected to two nodes. Each node can have a relationship type and a set of relationships with another node. In a specific implementation, relationships are always directed, but they can be navigated efficiently in any direction.

When an entity connects with one or more entities through a software application in any context, the same is captured by the organizational graph. The organizational graph engine receives navigation context or user query. It navigates through the organizational graph to search for the required data corresponding to the navigation context or user query. It retrieves the required records or data items belonging to one or more entities along with the relationship between them, from the organizational graph. In a specific implementation, these records are displayed to a human agent of an entity, who can be referred to as a "user."

The AI analytics engine hooks to the data in the data storage and provides valuable insights in the form of trend graphs, score values, etc. The AI analytic engine provides live insights into the data.

The network 402 is intended to represent a network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller. As used in this paper, a means for computing, initiating, or stopping (in a computer system context) includes a processor of some kind, and is intended to include a hardware processor executing instructions, if applicable.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, erasable programmable read-only memory (EPROM), or electrically erasable programmable read only memory (EEPROM), a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer system location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer system location." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an integrated services digital network (ISDN) modem, a cable modem, and other modems. Network interfaces can include, by way of example but not limitation, a token ring interface, a satellite transmission interface (e.g., "direct PC"), or other network interface for coupling a first computer system to a second computer system. An interface can be considered part of a device or computer system. As used in this paper, a means for sending, requesting, providing, or receiving includes an interface of some kind (potentially including a user interface).

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. For example, with reference to FIG. 5, the contextual module can be implemented as a contextualization engine, the access control module can be implemented as an access control engine, and the logic module can be implemented as a logic engine; the UI layer and data layer can also include engines, such as a UI processing engine, a customization engine, a UI level ID generation engine, a design element creation engine, or a data access engine (or the engines of the process layer can utilize datastores therefrom). As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer system for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

The network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

A LAN is a private network that connects devices within a limited area like a residence, an office, a building or a campus. A wired LAN uses Ethernet cables to connect computers together directly or more commonly, through a hub, switch, or router. Wireless networks use radio waves to connect devices such as laptops to the Internet and other hand held devices.

FIG. 5 is a diagram 500 functional layers and components of an example of a unified software suite. A 3-tier client-server architecture is used by way of example to build the unified software suite. In this example, there are three logical layers, a User Interface (UI) layer 502, a process layer 504, and a data layer 506. The data layer handles and stores data (if required), the process layer handles logic, and the UI layer controls a Graphical UI (GUI) that can be used to communicate with the other two layers. To offer unified experience, the connectivity or integration among entities should be reflected in all three layers.

Data items of the attributes in the entities are displayed on UI with a basic design element called a "card". There are several other types of design elements like list, popover, side-bar, etc. that can be used to display the data items. Popover can be actionable in scenarios in which, for example, they include provisions with a set of graphical elements, e.g., action buttons, to complete a task. Hence, the user can experience a uniform design and has no need to switch between the tabs of different software applications with different user interfaces. One or more data items are mapped to a corresponding design element that is itself mapped to a UI display mode based on the context and permission level determined by the contextualization engine and access control engine. Hence every data item has several different identities (IDs) in each functional layer of the unified software suite. Table 1 lists various IDs that are used in a specific implementation to display a data item from the data layer onto the UI layer to provide a seamless visual experience to the user.

TABLE 1

IDs for a data item in data layer and the UI layer

| Name | Description |
| --- | --- |
| UI level ID | The unique ID of the mode of the design element as viewed by the user. The examples of several modes of the design element say card refers to the height of the card, width of the card, etc. |
| Design level ID | The unique ID of the design element like card, list, popover, etc. Each design element has its ID created in the UI layer. Examples of design level ID include card ID, list ID, etc. |
| Data level ID | The unique ID of the data items of the attributes of every entity. It is generated when the data item is created for the first time. Even the information regarding the relationship between the attributes are also considered to be an entity. Thus they could also have a unique data level ID. |

There are several components which collectively represent the three layers of the unified software suite. Some of these components may exist on the user terminal, some on the server, or some combination thereof.

The data access platform 526 of the data layer 506 is an abstraction layer encapsulating the data access components 524 and functionality.

The data access component integrates access to different data sources. This component also coordinates data manipulation. In a specific implementation, in the event a storage offering shall be replaced or the interface of a storage offering changes, the data access component is the only component that has to be adjusted.

The logic module 522 of the process layer 504, which can be implemented as a logic engine, accepts user requests, processes them, and determines the routes through which the data will be accessed.

The access control module 520 of the process layer 504, which can be implemented as an access control engine, determines access permissions of users. In a specific implementation, the engine determines a data item or record a user can create, read, update, and/or delete (CRUD). The access permission depends on the following factors:
 i) Hierarchy level of the user in the organization;
 ii) Time zone or location of the user; and/or
 iii) Privacy related Permissions: An entity can choose who can access the personal information provided by them to the organization.

For example user 1, user 2 and user 3 can navigate to an interaction page. Each user can see the interaction page but the data displayed on the interaction page differs for each user depending on hierarchy level of the users in the organization. There will be some interactions which are common. There could be some additional interactions which are viewed by one of the users, say user 1, but not by user 2 and user 3. Thus user 1 has permission to access that particular interaction but not by user 2 and user 3.

As another example, consider user 1, user 2 and user 3 can navigate to a page, such as a customer page. Now say user 1 has access to view interactions related to product demo in entity mode between customer 1 and employee 1 in a geographical location (or time zone) 1, say the USA. But user 1 may not have access to view interactions related to product demo between customer 2 and employee 2 in a geographical location 2, say Europe. This acts as an additional filter to serve privacy policies of various countries and check the access to the data accordingly.

A person represented as an entity, such as an employee entity, can choose who can access the personal information provided by them to the organization. The person can also decide on who can access the personal information. For instance if it is determined an employee entity has interacted with a VIP customer entity, the said employee entity can decide the interactions that could be accessed only by the Chief Executive Officer (CEO) alone, then the interactions of the said entity with VIP customer can be accessed only by the CEO. Others who require access to the said interaction must request the employee for granting the access permission. Access log also plays a role here by providing the information regarding the entities which have accessed the personal information. In case any of the activity which tries to export the interaction out of the system, then it can be locked until the employee entity wishes to share the interaction.

The contextual module 518 of the process layer 504, which can be implemented as a contextualization engine, determines the origin of a user or finds an answer to the question "Where is the user from?" and builds context dynamically. In a specific implementation, the contextualization engine builds context which is a compound aggregate of the following sub-contexts:

i) Time zone or geographical location context of the user: Determining the current location of the user to analyze the place or time zone, from where the user is requesting access. For example, Consider two users user 1 and user 2 from different time zones. Then the cards could be displayed in day mode or night mode, based on the time zone of the user. Similarly, time zone plays a crucial role in representing dates (DD/MM/YYYY, YYYY/MM/DD), time format (12 hours, 24 hours) etc.

ii) Navigation pattern of the user: Determining the context of the activity cards based on the navigation pattern of the user. As an example, consider a user viewing interactions of a company entity "Zenn Inc." The user can navigate to the activity screen of an employee entity from the activity screen of the company entity Zenn Inc. A list of activity cards related to the selected employee entity will now be displayed to the user. This difference is due to the change in the navigation context. The navigation could also be from an entity, for example an application used for communication purposes. Assume a scenario when a user is communicating or chatting with a customer using a software application for communication. Now the communication itself becomes a context to the customer and the customer becomes a context to the communication.

iii) Personalized or preferential context: Determining the customizations required by user according to his/her personal preferences (due to age factor, a disability like color blindness, etc.) like font size, color themes, etc. For a user with a disability like color blindness, the UI level ID of the cards will be different when compared to the UI level ID of the cards displayed for a normal user without any disability.

iv) Privacy related context: Accessing details of each entity based on a static permission set by the entity itself. The static permissions set by the entity are stored in a data storage. For example an entity say employee can decide on what personal information he/she can provide to the organization. If the organization entity does not have a static permission and still tries to access the personal information of the employee, then the employee is immediately notified about this to seek his/her permission in real time. Usually data protection regulations like GDPR mandate these kind of privacy preservation policies for customers. The proposed unified software suite not only offers such benefits to customer entity alone. It is possible to preserve the privacy of any persona-based entities like employees, contacts, etc.

Based on access permission and context determined by the access control engine and contextualization engine, data items to be mapped to design elements are filtered from the organizational graph. The design elements are mapped to the corresponding UI level ID as determined by the contextualization engine and access control engine. The UI level ID generator 514 of the UI layer 502 generates the UI level IDs and the design element creator 516 of the UI layer 502 creates design element instances.

The UI components 510 of the UI layer 502 are various design elements present on the UI. Because users have often become familiar with the way these design elements work, consistent and predictable choices become desirable, which leads to smooth task completion, efficiency, and satisfaction of the users. User interactions on the UI are synchronized and organized by the UI process components 508, when implemented as UI process component engines. This enables the same basic user interaction patterns to be reused by multiple user interfaces. The customization module 512, when implemented as a customization engine, customizes the visual appearance of the design elements by user request.

Design elements include cards, lists, popovers, side bars, input controls, informational components, navigational components, containers, etc.

Design element creator aids in the process of creating the design elements like cards, lists, pop over, etc. In a specific implementation, there exists a separate module for creating each type of design element. For instance, a card creator is involved in creating cards, a list creator is involved in creating lists, and a pop over creator is involved in creating pop overs. Similarly, other such creators are involved in creating other types of design elements.

Figure 6:
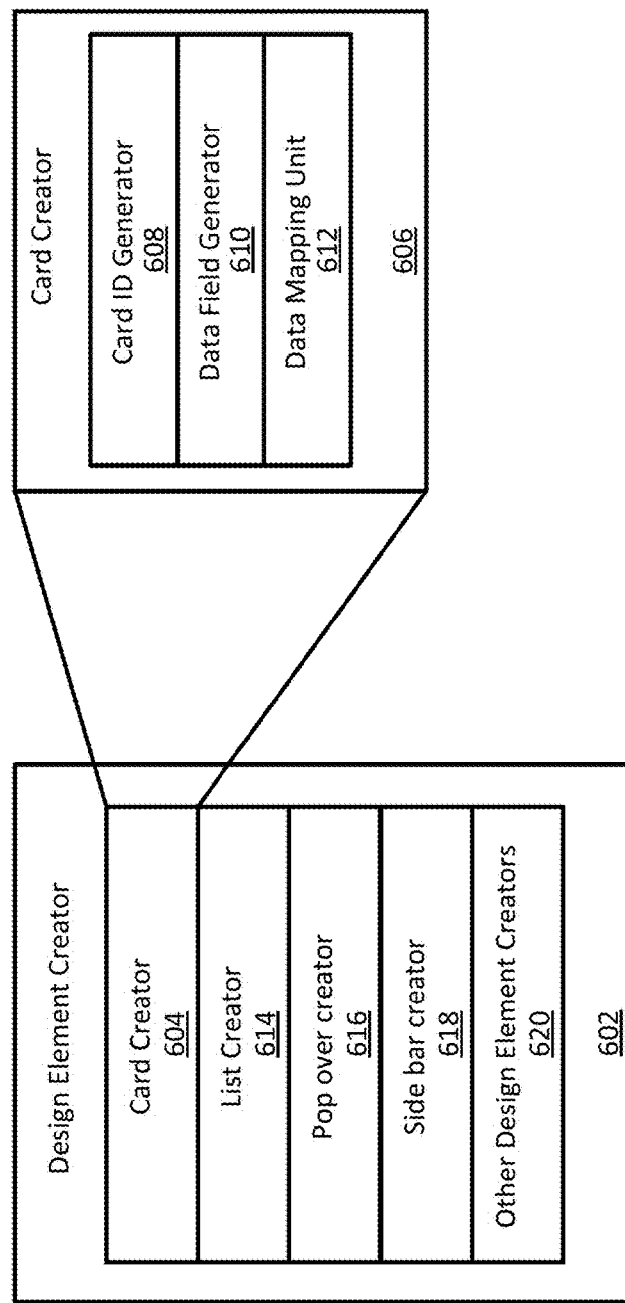
FIG. 6 is a diagram of an example of a design element creator.

FIG. 6 is a diagram 600 an example of a design element creator. In the diagram 600, a design element creator 602 includes a card creator 604, a list creator 614, a popover creator 616, a sidebar creator 618, and other design element creators 620. The card creator 604 of the design element creator 602 creates and customizes card designs. A "card" is an UI design pattern that groups related information or data items of one or more entities in a flexible-size container that, at least in a specific implementation, visually resembles a playing card, hence the name. Despite its origin, the term "card" is intended to include modular shapes that do not resemble playing cards. The card is used to create modular UI patterns as it works well across a variety of screens and window sizes. In a specific implementation, cards have the following properties: Cards are used for grouping information; cards present a summary and link to additional details; and cards allow for flexible layouts.

In the example of FIG. 6, the card creator 604 is blown up for more detail as card creator 606. The card creator 606 includes a card ID generator 608, a data field generator 610, and a data mapping unit 612. The card ID generator generates a unique ID for every card, called Card ID which is actually a type of design level ID. In a specific implementation, the data field generator is a drag and drop interface enabling users/designers to drag and drop database fields (or custom computed fields) on to the card design to represent the data item. On top of dragging a field to a card, the data mapping unit maps data level ID of required data items from the data storage to corresponding database fields. The mapping process associates the data items and cards based on context (as determined by the contextualization engine) and access permissions (as determined by the access control engine). Database fields are just one type of element represented on a card. Other elements could be text, tags, images, etc. Data represented on a card can come from custom applications or third-party applications/sources.

The card creator comprises a card ID generator, a data field generator, and a data mapping unit. The card ID generator generates a unique ID for every card, called Card ID which is actually a type of design level ID. In a specific implementation, the data field generator is a drag and drop interface enabling users/designers to drag and drop database fields (or custom computed fields) on to the card design to represent the data item. On top of dragging a field to a card, the data mapping unit maps data level ID of required data items from the data storage to corresponding database fields. The mapping process associates the data items and cards based on context (as determined by the contextualization engine) and access permissions (as determined by the access control engine). Database fields are just one type of element represented on a card. Other elements could be text, tags, images, etc. Data represented on a card can come from custom applications or third-party applications/sources.

Each card can have multiple display designs or visual patterns (modes, size, filter, etc.). The UI level ID generator generates UI level ID for each design of the card. A single card ID can be mapped with multiple UI level IDs. A card can be displayed in different UI designs and even with different contents. The visual pattern can differ in each case. Every visual pattern has a unique UI level ID. This means that a single card ID can be mapped to multiple UI level IDs. UI level ID is picked based on the context and access permission determined by the contextualization engine and access control engine. It can also be customized based on user requirements.

Figure 7:
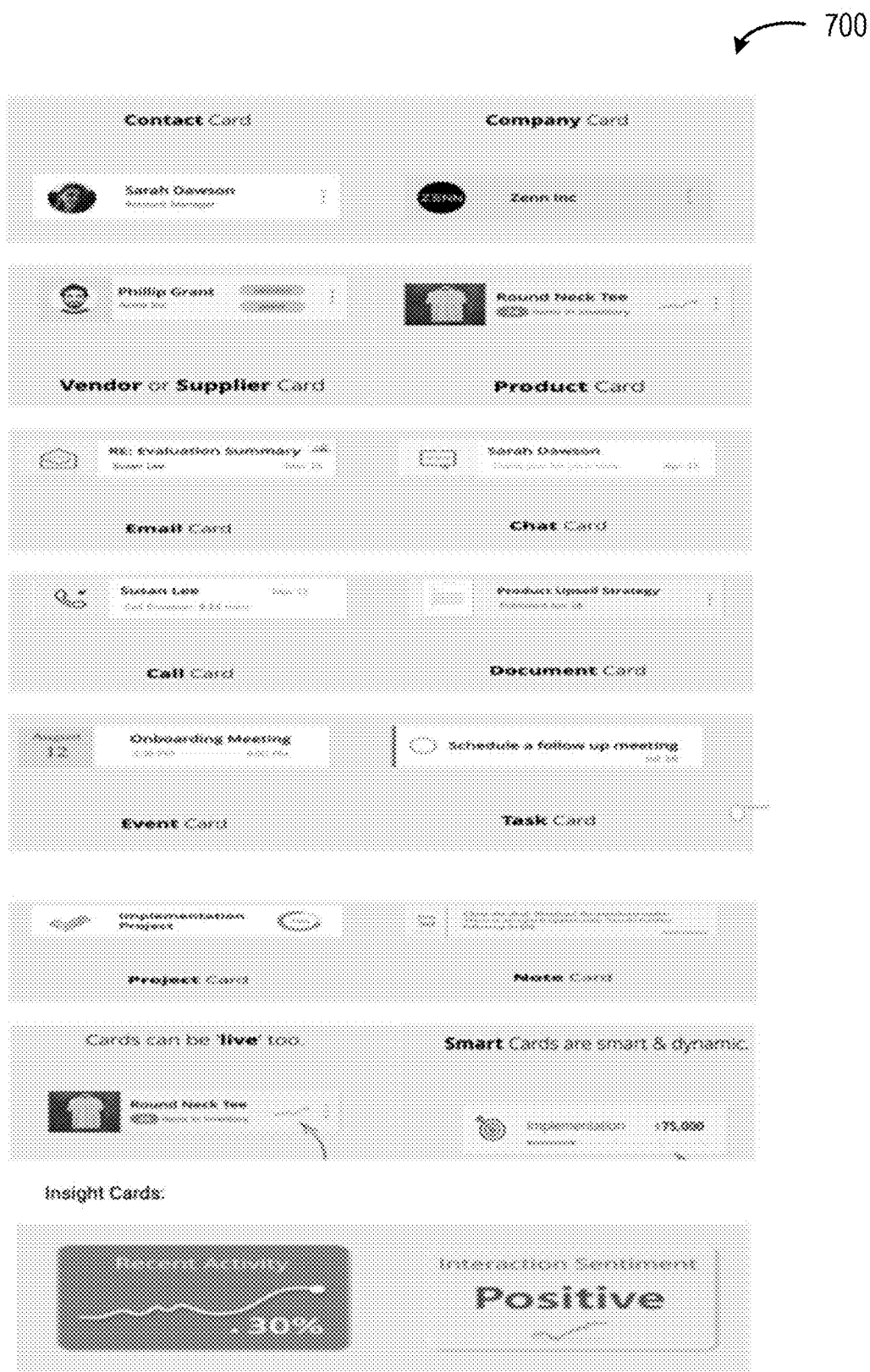
FIG. 7 includes screenshots of examples of different types of cards.

FIG. 7 includes screenshots 700 examples of different types of cards. Based on the relationship of the entities, cards can be broadly classified into three categories, collaboration card, communication card or interaction card, and productivity card. Collaboration card is further classified into task card, event card, activity card, etc. Communication card or interaction card is further classified into email card, chat card, audio call card, video call card, meeting card, etc. Productivity card is further classified into feed card, file card, forum card, etc. Based on the type of entity, the cards can also be classified into contact cards (contact card of an employee, company, customer, supplier, vendor, etc.), product card, etc. The cards can be smart cards, live insight cards, and snapshot cards. The contents of these cards are highly dynamic corresponding to the trend analytics of the data items mapped to it.

Figure 8:
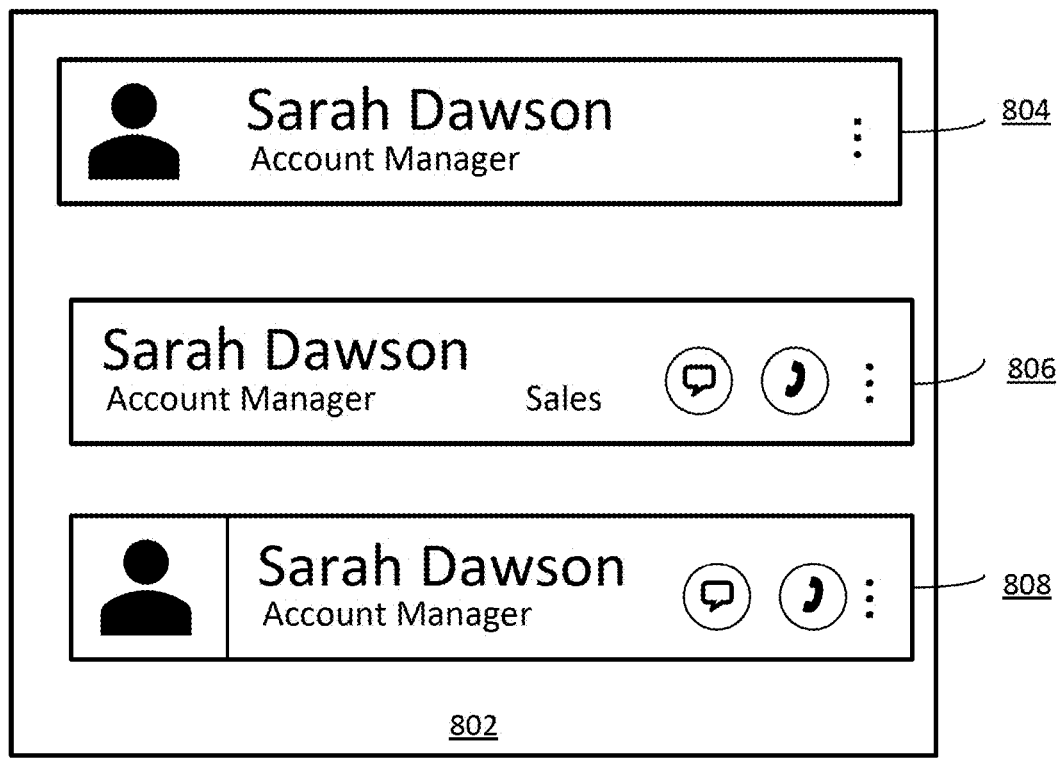
FIG. 8 includes conceptual illustrations of multiple designs of a card for an "employee" entity.
Figure 9:
FIG. 9 is a diagram of day mode and night mode variations of a card for an "employee" entity.
Figure 10:
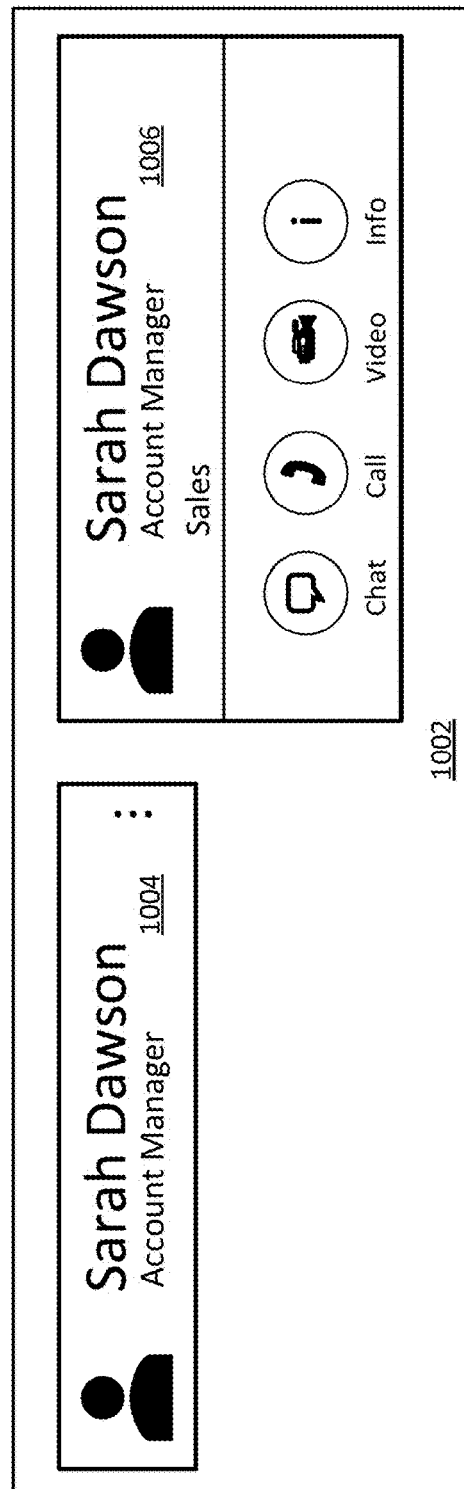
FIG. 10 is a conceptual diagram of a card of an "employee" entity with different heights (single and double).

FIG. 8 includes conceptual illustrations 802 of multiple designs 804, 806, 808, of a card for an "employee" entity. A card can be displayed in different modes i.e., day mode and night mode. FIG. 9 is a diagram 900 of day mode and night mode variations of a card for an "employee" entity. A card can also be displayed in different heights i.e., single height and double height. FIG. 10 is a conceptual diagram 1000 of a card of an "employee" entity with different heights (single and double).

An entity details screen displays a summary of a selected entity when a user clicks on one of the entity cards from, e.g., an entity list. If each card takes the user to a respective software application that owns the data, they will be treated with a different user experience for each entity. Advantageously, software applications can be pushed behind to focus on the entities and offer a consistent UI for every entity to provide a uniform experience.

Figure 11:
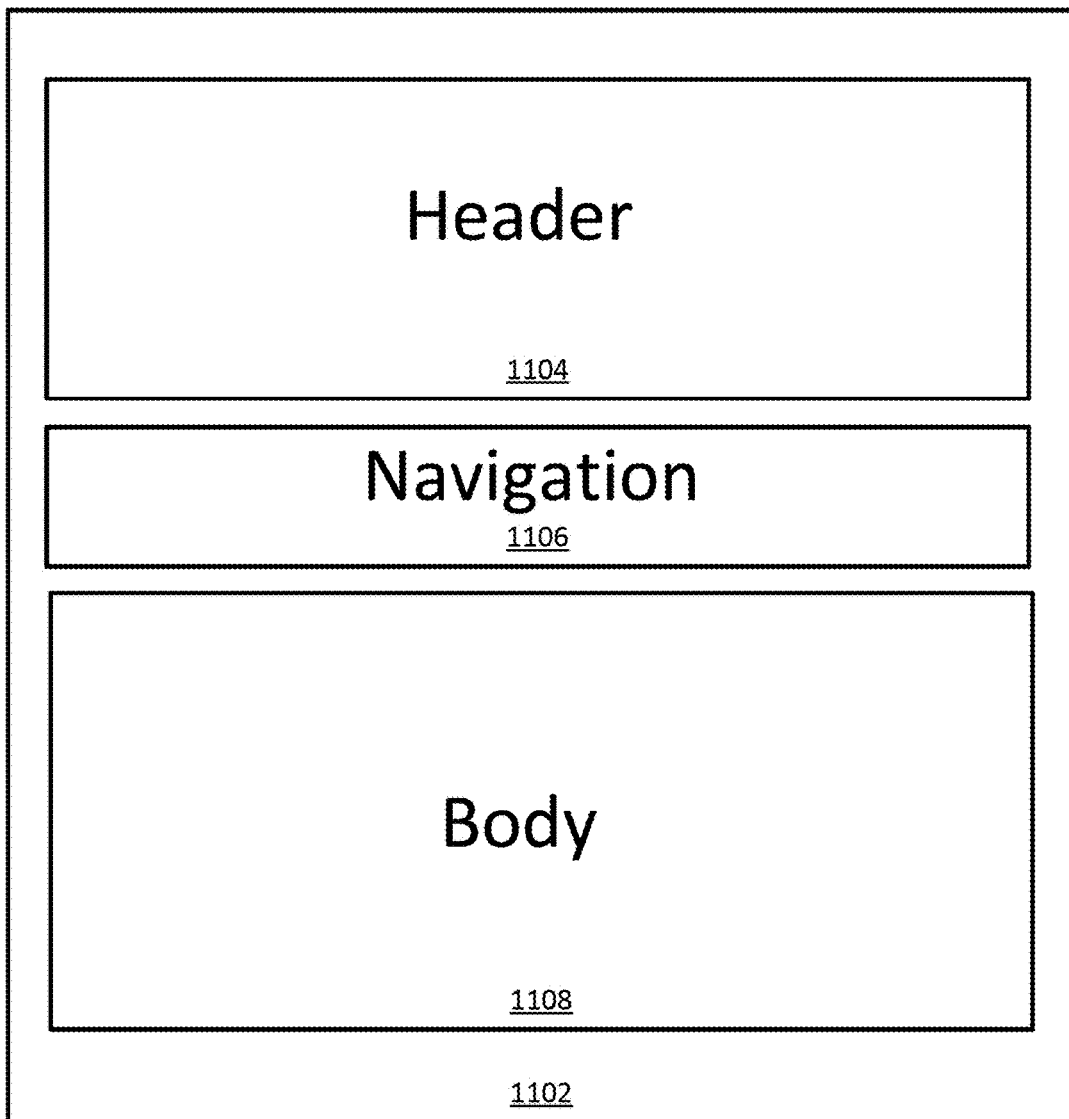
FIG. 11 is a block diagram of a layout of an example of an entity details screen.

FIG. 11 is a block diagram 1100 of a layout of an example of an entity details screen (or entity details page). The entity details screen for each entity is different and can be dependent on relationships, context, and access rights/permissions of the user. In this example, an entity details screen 1102 is split into header 1104, navigation bar 1106, and body 1108.

The header of the entity details screen indicates common information about the entity which is accessible by all. It includes entity logo and address, tags, snapshot cards, and live insight cards. A couple of entities, "customers" and "employees", have been picked to illustrate entity details. For this example, customers will have two sub-entities in the Business-to-Business (B2B) context, namely "company" and "contact(s)." The entity details screens for Company, Contact & Employees have been used to illustrate the concept.

Figure 12:
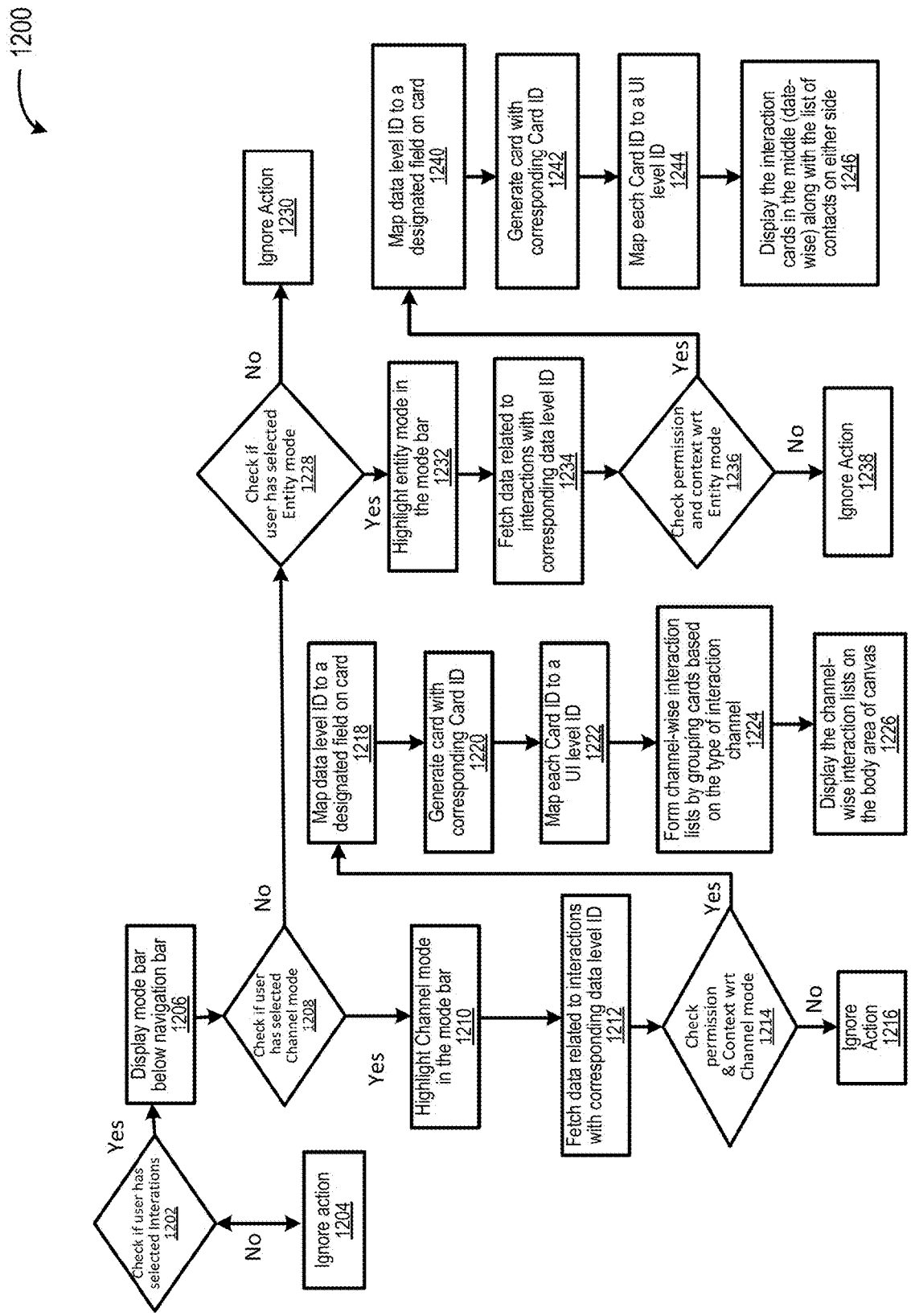
FIG. 12 is a flowchart of an example of a method for displaying an interactions screen for an entity.

FIG. 12 is a flowchart 1200 of an example of a method for displaying an interactions screen (or interactions page) for an entity. When a user selects an interactions tab from a navigation bar on an entity details screen, the user is navigated to an interactions screen of the selected entity. The flowchart 1200 starts at decision point 1202 with checking whether a user has selected interactions; if not (1202-No) the flowchart ends at module 1204 for the purposes of this example. Otherwise (1202-Yes), the flowchart 1200 continues to module 1206 with displaying a mode bar below a navigation bar and to decision point 1208 with checking whether the user has selected channel mode. A mode bar is displayed below the navigation bar to indicate a display of the interaction trends—Channel mode (to view interaction trends by channel) and Entity mode (to view interaction trends by entity). The user can select any mode as desired to view the interactions. In a specific implementation, if the user selects channel mode, that is highlighted on the mode bar, and if the user selects entity mode, that is highlighted on the mode bar.

If the user selected channel mode (1208-Yes), the flowchart 1200 continues to module 1210 with highlighting channel mode in the mode bar, to module 1212 with fetching data related to interactions with corresponding data level ID, and to decision point 1214 with checking permission and context with respect to channel mode; if not (1214-No), the flowchart ends at module 1216 for the purpose of this example. Otherwise (1214-Yes), the flowchart 1200 continues to module 1218 with mapping data level ID to a designated field on a card, to module 1220 with generating a card with a corresponding card ID, to module 1222 with mapping each card ID to a UI level ID, to module 1224 with forming channel-wise interaction lists by grouping cards based on type of interaction channel, and to module 1226 with displaying the channel-wise interaction lists, where the flowchart ends for the purpose of this example.

If the user has not selected channel mode (1208-No), the flowchart 1200 continues to decision point 1228 with checking if the user has selected entity mode; if not (1228-No), the flowchart ends at module 1230 for the purposes of this example. Otherwise (1228-Yes), the flowchart 1200 continues to module 1232 with highlighting entity mode in the mode bar, to module 1234 with fetching data related to interactions with corresponding data level ID, and to decision point 1236 with checking permission and context with respect to entity mode; if not (1236-No), the flowchart ends at module 1238 for the purposes of this example. Otherwise (1236-Yes), the flowchart 1200 continues to module 1240 with mapping data level ID to a designated field on a card, to module 1242 with generating a card with a corresponding card ID, to module 1244 with mapping each card ID to a UI level ID, and to module 1246 with displaying the interaction cards in the middle (date-wise) along with a list of contact cards on either side, where the flowchart ends for the purpose of this example.

Figure 13:
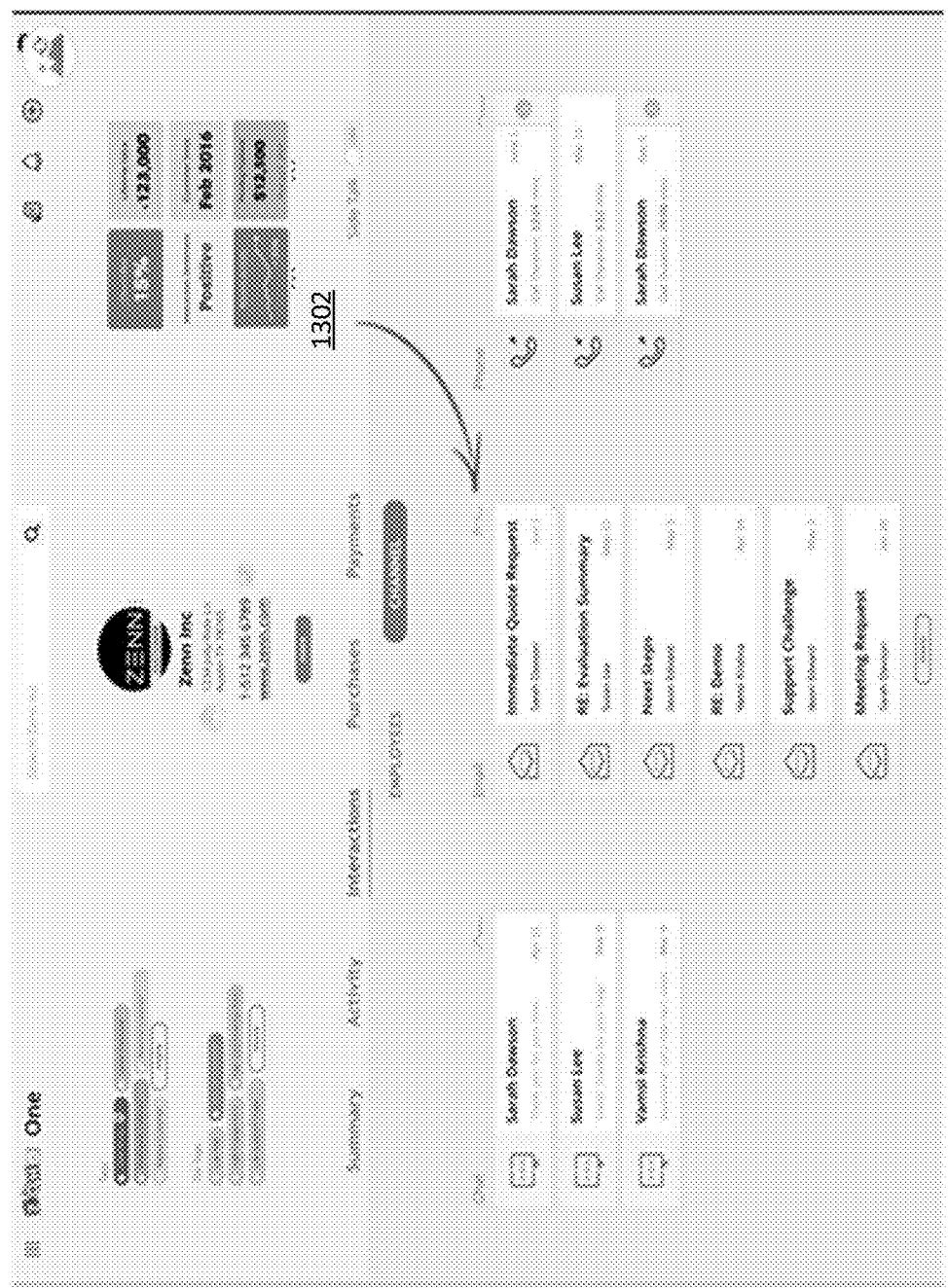
FIG. 13 is a screenshot of interaction trends by channel for a "company" entity.

FIG. 13 is a screenshot 1300 of interaction trends by channel for a "company" entity. Interaction trends by channel can lead to insights, particularly when filtered by individual preferences. Channel mode displays interaction trends by channels, e.g., e-mail, phone calls, chat, etc. Entity mode displays interaction trends by entity, e.g., instances of interaction in a middle column with the list of entities involved with the interactions on the left and right. The name of the entity mode can change with the type of entity. For example, the entity mode can be referred to as "Employees" mode in FIG. 13 and as "Me" mode in FIG. 17, which is described later.

The organization graph engine retrieves data items or records from the organizational graph (stored in the organizational graph datastore) corresponding to an entity card selected by a user. The organization graph engine also retrieves the relationship or connection of the selected entity from the organization graph, with the other nodes representing one or more entities across the organizational graph.

The data level ID of each data item is mapped into a design element (card). The relationship of the data item too can be mapped to the card, if required. A card, such as an interaction card, is created for each interaction instance. Each card has a unique card ID. The card ID is mapped to a UI level ID corresponding to the context and access permission as determined by the contextualization engine and access control engine, respectively.

Cards are displayed on the body area (1302 in the example of FIG. 13). The information displayed by the cards and their arrangement depends on the mode selected by the user. If the user has selected Channel mode, then the interaction cards are grouped based on the channel, e.g., mail, call, chat, etc., and displayed to the user. If the user has selected Entity mode, then the interaction cards (across all channels) are displayed in a middle column along with the list of persona-based entities, involved with the interactions, on either side.

In a specific implementation, by default, the interactions can be displayed in any mode and the user can switch to another mode as needed.

In the example of FIG. 13, instances of interactions have been grouped based on type, such as text messages or chats, e-mails, and phone calls. In another instance, only a set of latest interaction instances (within a predetermined time) are displayed. The other (probably older) interaction instances can be displayed when the user clicks a "more" button below the list corresponding to each channel.

Each instance of interaction of a channel is represented by a card. In a specific implementation, each channel displays a list (e.g., a collection of interaction cards ordered in reverse chronological order). When a channel, e.g., an e-mail channel, has multiple interaction cards across the same channel and on the same day, email interaction cards can be stacked on one another and displayed as collapsible cards. The collapsible cards can be expanded to view the details. If a channel, e.g., a chat channel, has an interaction card that represents a group chat, the interaction card displays it with a group icon on the right-side top corner of the card.

Figure 17:
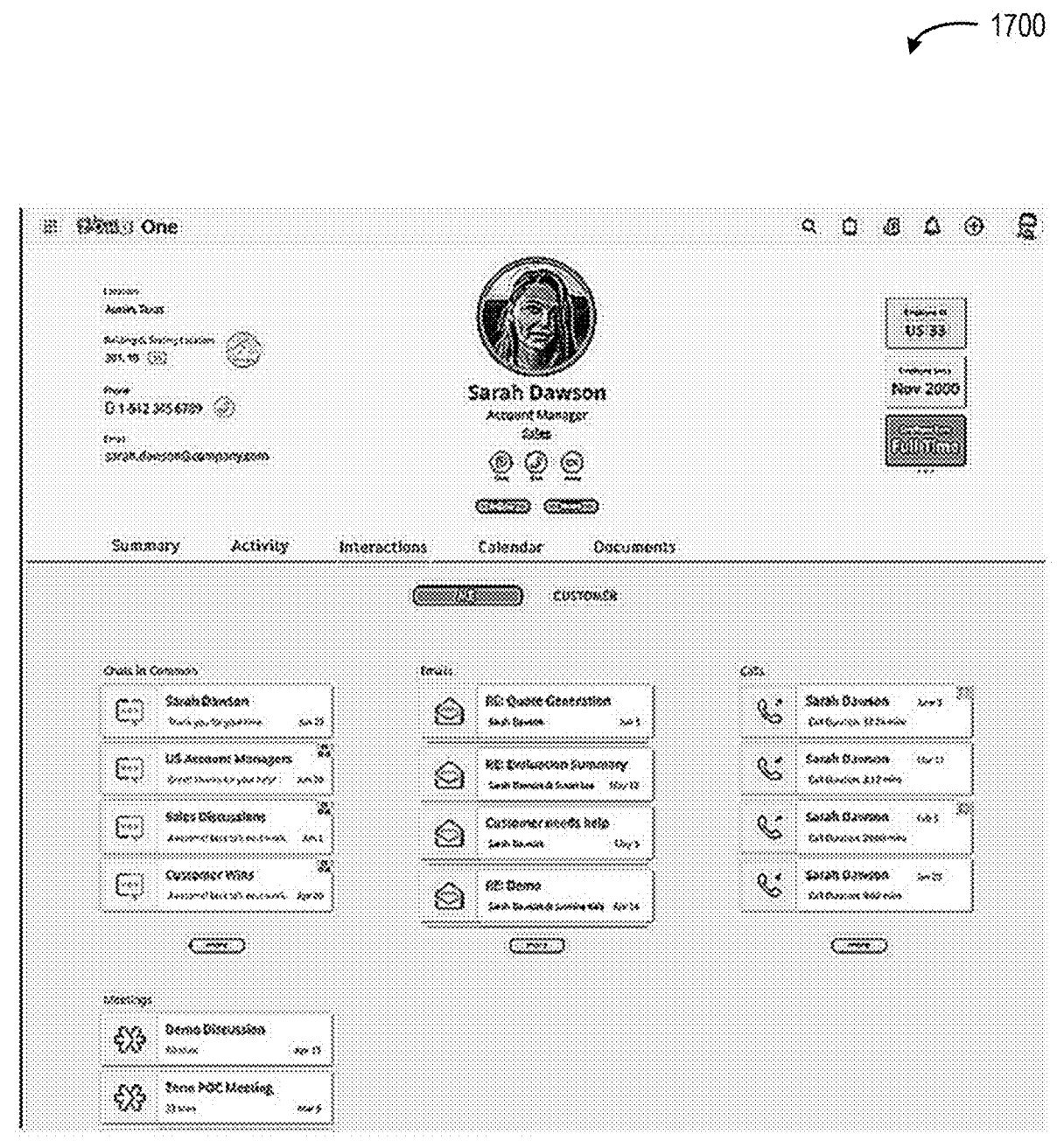

Assume, e.g., a phone call channel includes a list of interaction cards representing phone calls. In a specific implementation, if there is more than one interaction card representing a call to/from the same entity, these cards are numbered serially. The interaction card representing the phone calls thus comprises a serial number to denote the multiple instance of interaction with the entity. As another example, if a call has been initiated through a specific software application, e.g., ZOHO Cliq, then the app icon of ZOHO Cliq can be displayed on the interaction card. This is shown in FIG. 17 under channel list for call type interaction.

In a specific implementation, a line graph is dedicated to each channel and can be displayed, for example, on the top right corner of each channel list. It indicates the interaction trend across each channel over a period of time. This line graph illustrates recency of interaction trend. The recency of interaction trend shows the highs and lows across each channel. Highs relate to a positive trend line with a positive correlation. Lows relate to a negative trend with a negative correlation. In the example of FIG. 13, high recurrence of an interaction over a period of time between the user and the company entity "ZENN INC" is a positive correlation whereas low recurrence of an interaction is a negative correlation. The line graph is generated by the AI analytics engine (in FIG. 4) based on the recency of the interactions between two or more entities, as recorded in the organizational graph.

The interaction trends can also be displayed by entity. In entity mode, the interaction instances across channels are displayed in a middle column, with a list of contacts involved in the interactions on either side. Interaction instances and contacts are displayed in the form of cards.

The interaction cards displayed in entity mode, can be filtered by the user either based on calendar or channels using corresponding filters (present on the top right corner of the body area of the canvas). If they are being filtered based on calendar, then the interaction cards appear in reverse chronological order. If they are being filtered based on channels, then they are ordered channel-wise. For example, the list of e-mails (in reverse chronological order) appears topmost. Lists of calls, meetings, and chats follow the e-mail list. The cards in each list are arranged in reverse chronological order.

In this example, if there are no interactions for a predetermined period, then it is indicated using a dotted line in the entity mode display.

If there are multiple interaction instances, say e-mail, across the same channel and on the same day, then email interaction cards are stacked on one another and displayed as collapsible cards. The collapsible cards can be expanded if required by the user, to view the details.

Figure 14:
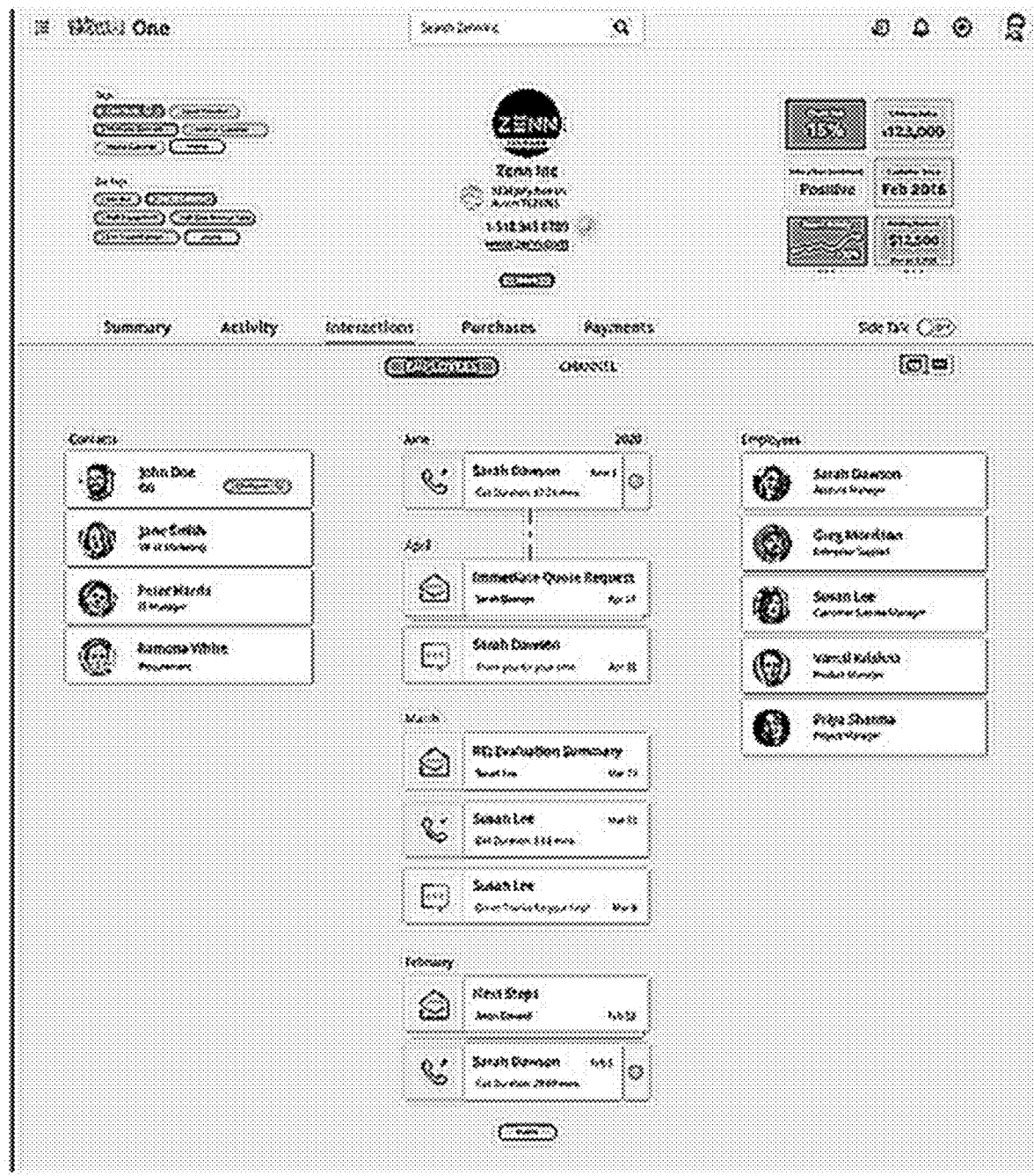
FIG. 14 is a screenshot of interaction trends by entity for a "company" entity.

FIG. 14 is a screenshot 1400 of interaction trends by a "company" entity. FIG. 14 shows a screenshot of interaction trends by Company with interactions across channels like phone, email and chat in a middle column, with a list of "employee" entities and "contact" entities on either side. If a user selects an entity card from the list of "contact" entities, the user is navigated to the entity details screen of the selected entity. In this example, on an input stimulus, such as a mouse over operation on any interaction instance (while the user is viewing the interactions in entity mode), the interaction instance along with the corresponding originator and receiver entities are highlighted and connected with a connector.

Figure 15:
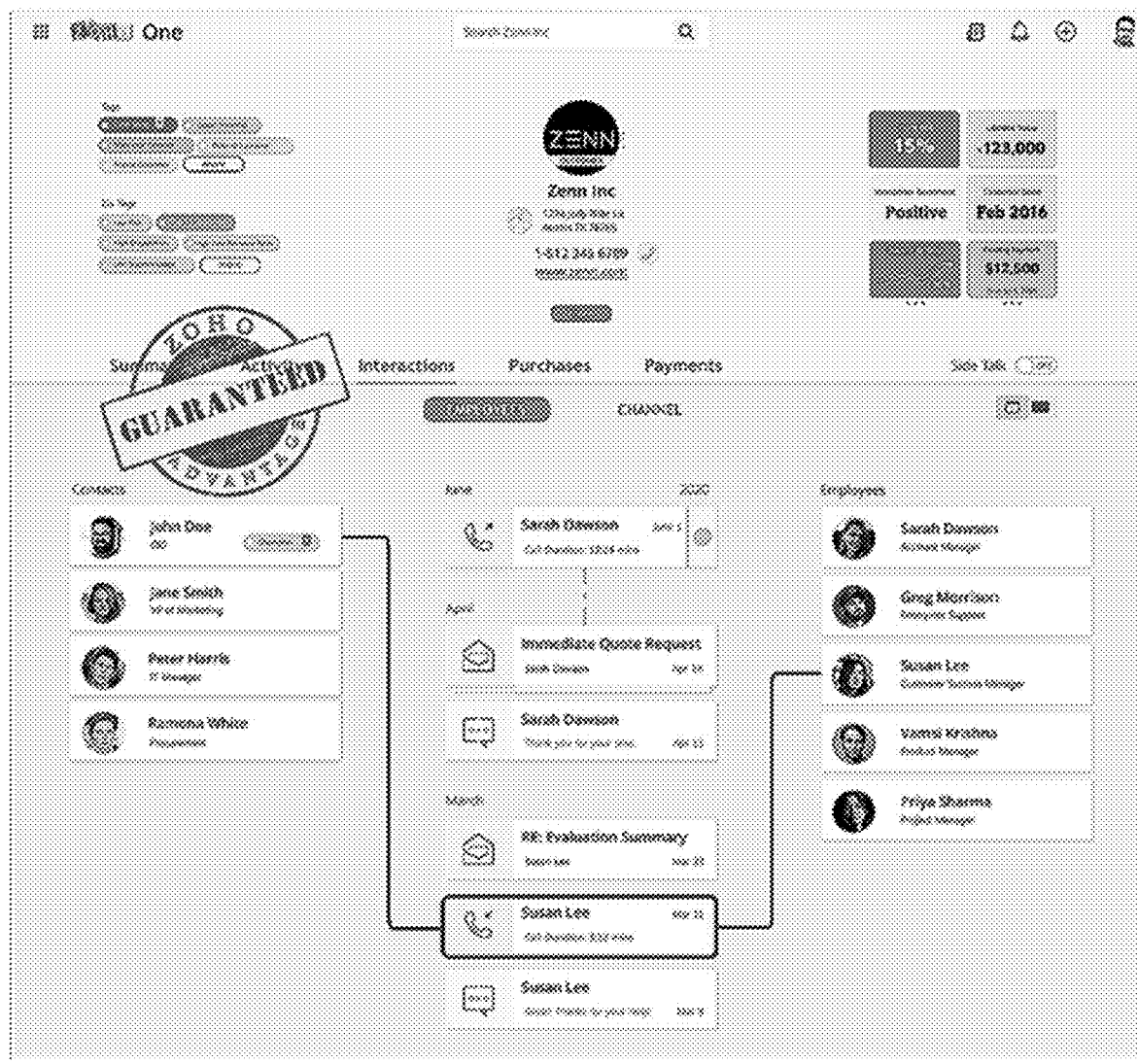
FIG. 15 is a screenshot of interaction trends by entity for a "company" entity on mouse over operation.

FIG. 15 is a screenshot 1500 of interaction trends by entity for a "company" entity on mouse over operation. In entity mode, on mouse over operation on any interaction instance, the "contact" entity, the interaction instance and the corresponding "employee" entity/entities involved in the interaction are highlighted and connected with a connector.

Figure 16:
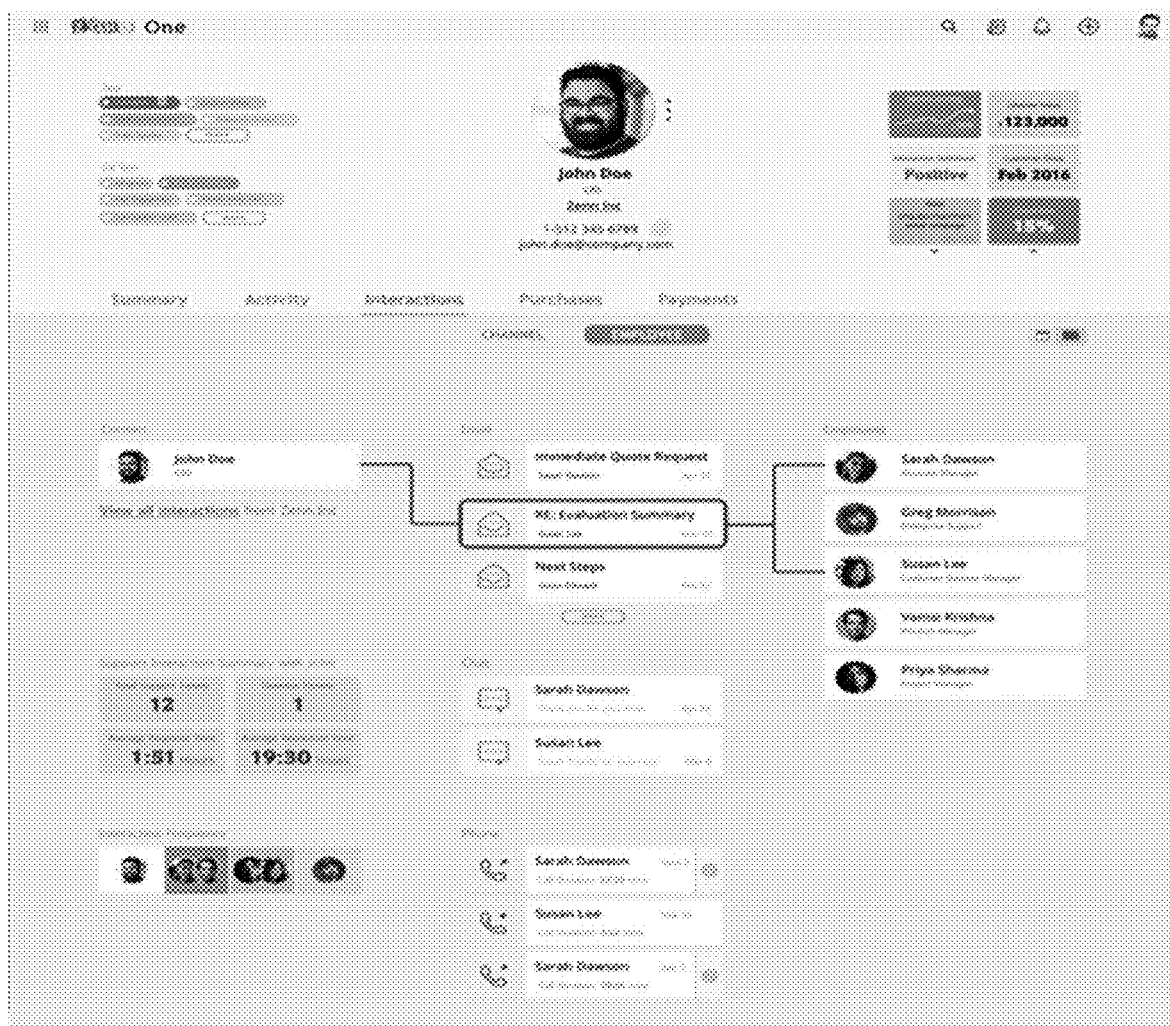
FIG. 16 is a screenshot of interaction trends by entity for a "contact" entity.

FIG. 16 is a screenshot 1600 of interaction trends by entity for a "contact" entity. A user can navigate to an interaction page of any entity. The user has navigated to the interactions page of contact entity John Doe. The interactions of contact entity of John Doe among employee entities are displayed. On mouse over, on an interaction instance, the corresponding "employee" entity/entities involved in the interaction are highlighted and connected with a connector. Content of interaction page differs for each entity which is determined by contextual module and permission module. It also differs for entity who is viewing the interaction page. If two users view the same interaction page at the same time, the contents of the interaction page to be displayed are determined by contextual module and permission module. As an example, the interaction page of the contact entity "John Doe" differs for User 1 and User 2 based on access control module and contextual module.

In the example of FIG. 16, on mouse over, on an interaction instance, a summary of the interaction instance is provided. The summary provides insights of interaction support by an entity. An entity interaction summary is captured for the "contact" entity John Doe for the highlighted interaction instance and displayed below the list of contacts, e.g., to the left of interactions across channels.

In the example of FIG. 16, support interactions are a filter. The support interaction comprises a summary with total number of tickets handled by a "contact" entity, number of overdue tickets, average response time and average resolution time for the highlighted interaction instance.

In the example of FIG. 16, the entity page of the "contact" entity displays interaction frequency of the contact among the other entities. The interaction frequency represents how frequently an entity interacts with other entities, across different channels like phone calls, e-mails, chats (or text messages), meetings, etc. The average response time, people this entity "contact" interacts with, etc., are unique to each entity. The interaction frequency represents the frequency of communication between two entities. The frequency of communication can be understood just by seeing the cards with varying intensity of the color used in the cards, as shown in FIG. 16.

In the example of FIG. 16, interactions frequency cards representing interaction frequency among John Doe, Sarah Dawson and Vamsi are represented with high intensity of color (not visible in the drawings because they lack color) as their interactions are most frequent. Interactions frequency card representing interaction frequency among John Doe, Priya Sharma, and Susan Lee is represented with medium intensity color as their interactions are comparatively lesser. Interactions frequency card representing interaction frequency between John Doe and Greg Morison is represented with low intensity color as the interaction is the least frequently recorded.

The interaction summary and interaction frequency are displayed in the form of insight cards. The data items mapped on the insight card can vary for each entity interaction as determined by the contextual module and access control module. The AI analytics engine (in FIG. 4) plays a role in the generation of the insight cards.

FIG. 17 is a screenshot 1700 of interaction trends by channel for an "employee" entity. In this example, the "employee" entity is for Sarah Dawson. In the figure, "Me" refers to the user's entity. The interaction page in channel mode displays list of interactions channel-wise between the user entity and the employee entity Sarah Dawson. In the figure, "Customer" refers to Sara Dawson's interactions with other "customer" entities. On choosing "Customer" the user can navigate to interaction page of Sarah Dawson with customers. This is based on the user entity's access rights.

Figure 18:
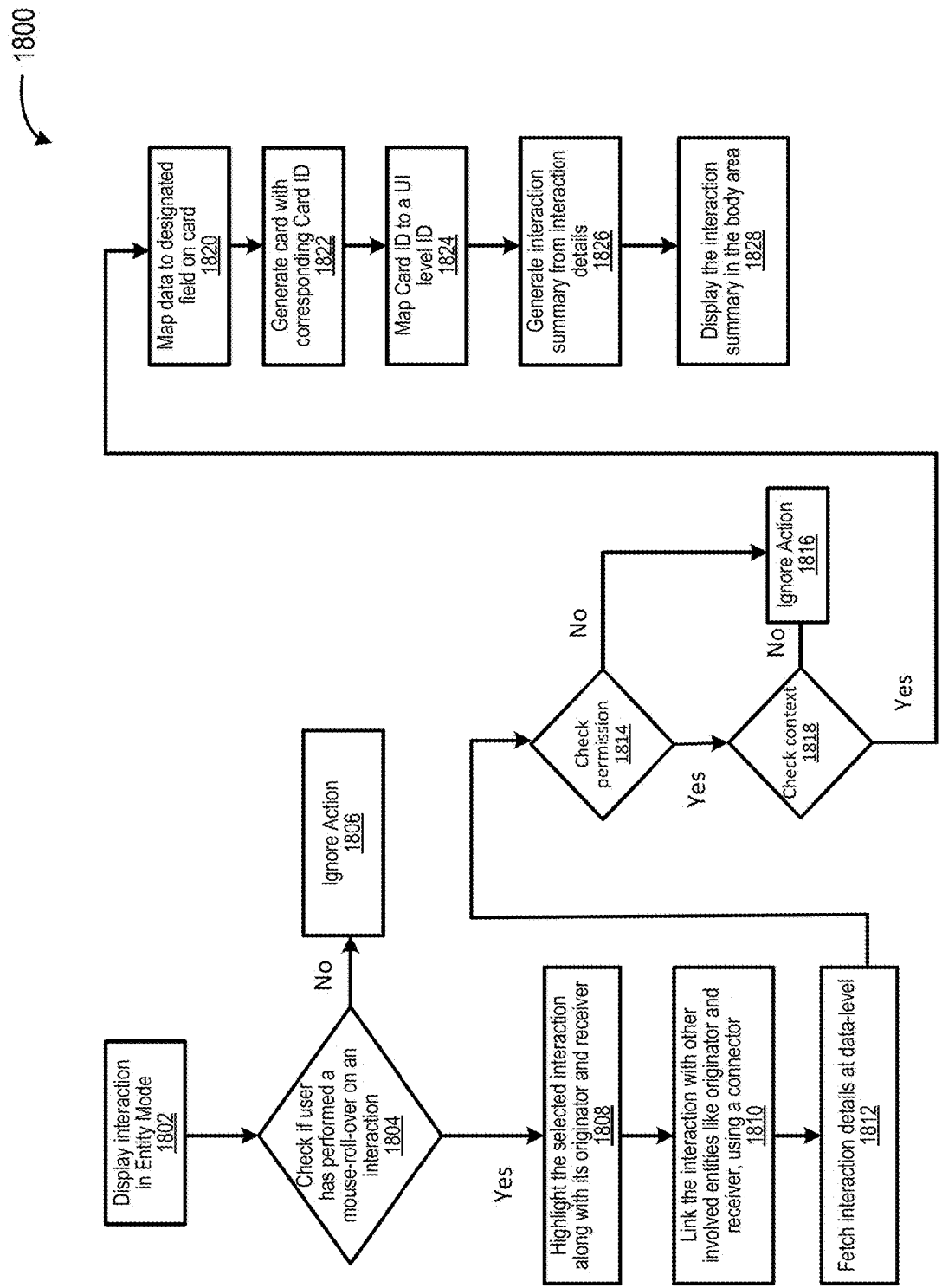
FIG. 18 is a flowchart of an example of a method of displaying interaction summary on detecting a mouse over event on an instance of interaction.

FIG. 18 is a flowchart 1800 of an example of a method of displaying interaction summary on detecting a mouse over event on an instance of interaction. Each interaction is captured and stored in the organizational graph. When a user performs a mouse over operation on a particular instance of the interactions in entity mode, the following events occur:

i) On mouse over operation on any interaction instance, the interaction instance and the corresponding entities (originator and receiver) from the list of contacts (on either sides of the interactions across channels) are highlighted and connected with a connector.

ii) Data items and their relationship corresponding to the interaction (on which mouse over operation has been performed by user), is fetched from the organizational graph. The system-level signal analyzer generates metadata for each interaction which is also fetched from the data storage. The context and access permission are determined by the contextual module and access control module. The data level ID of the data items are mapped on a design element called card. A card is generated with a unique card ID. Each card ID is mapped to the UI level ID based on the context and access permissions as determined by the contextual module and access control module. An interaction summary is generated and displayed to the user.

The flowchart 1800 starts at module 1802 with displaying interaction in entity mode and to decision point 1804 with checking if user has performed a mouse-over on an interaction; if not (1804-No), the flowchart ends at module 1806 for the purpose of this example. Otherwise (1804-Yes), the flowchart 1800 continues to module 1808 with highlighting the selected interaction along with its originator and receiver, to module 1810 with linking the interaction with other involved entities like originator and receiver, using a connector, to module 1812 with fetching interaction details at data-level, to decision point 1814 with checking permission and to decision point 1818 with checking context; if not (either 1814-No or 1818-No), the flowchart ends at module 1816 for the purpose of this example. Otherwise (1814-Yes and 1818-Yes), the flowchart 1800 continues to module 1820 with mapping data to a designated field on a card, to module 1822 with generating a card with a corresponding card ID, to module 1824 with mapping card ID to a UI level ID, to module 1826 with generating an interaction summary from interaction details, and to module 1828 with displaying the interaction summary.

Figure 19:
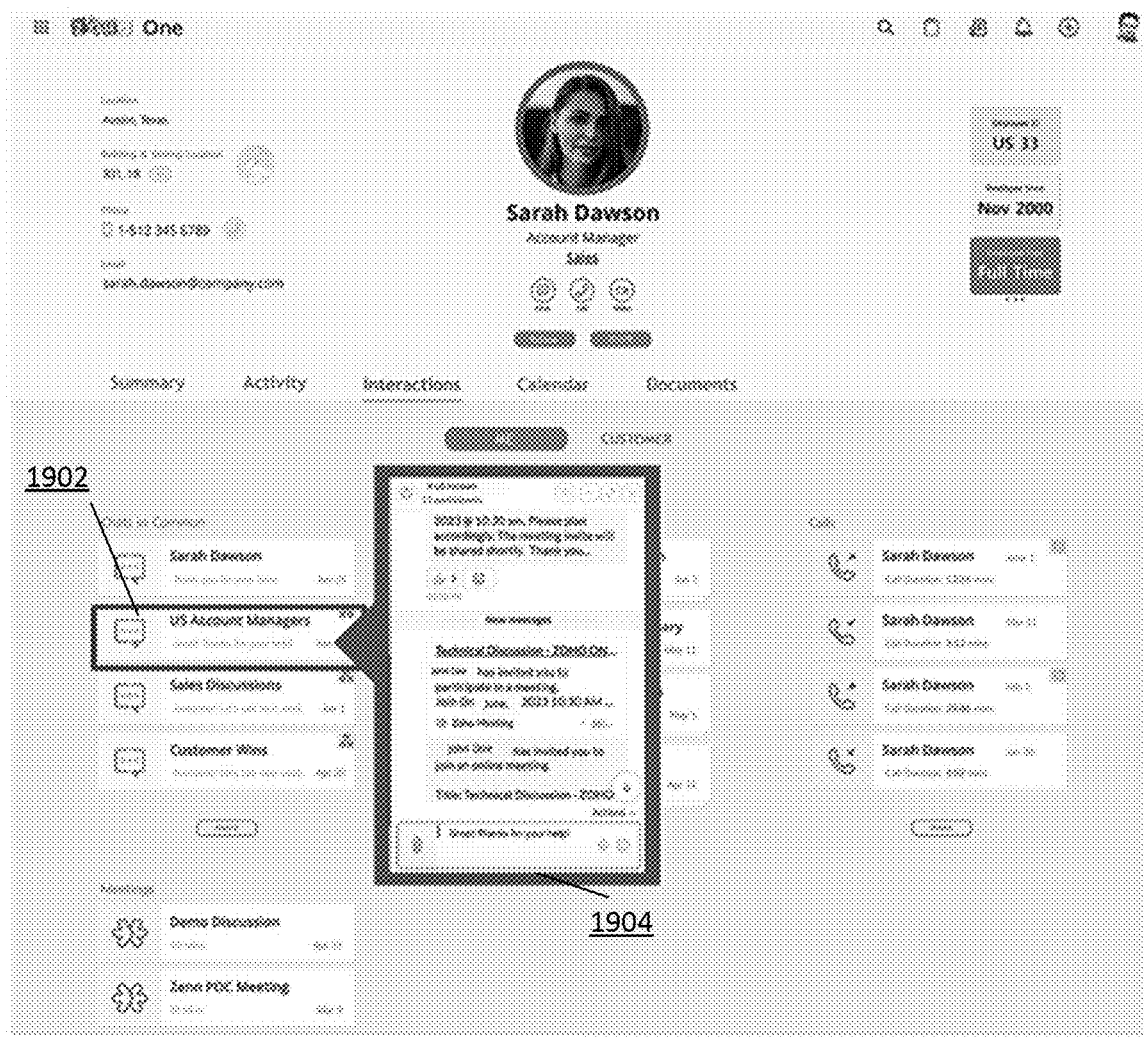
FIG. 19 depicts a screenshot of actionable popover of interactions in channel mode.

FIG. 19 depicts a screenshot 1900 of actionable popover of interactions in channel mode. A mouse-over action on any interaction card (1902 in the example of FIG. 19) displays a popover (1904 in the example of FIG. 19). A popover is a summarization of the interaction. Popovers can also be actionable, it allows the user to view and respond to an interaction. When an input stimulus is detected in association with an actionable popover, a process associated with the action is executed by an artificial agent of the unified software suite. As illustrated in FIG. 19, in channel mode, on mouse over operation on an email interaction instance with a subject "Demo" a core content of the email is displayed. Here the core content relates to a "Sales Dashboard Demo" of ZOHO CRM product. The user can view the demo from the popover without navigating to the Email application. The user can also execute actions such as "Buy Product" or "Send Enquiry" via popovers. This action is captured and stored by the organizational graph engine and is reflected across the unified software suite. The size and color of the popovers are customizable. Similarly, a mouse over operation on an interaction trend displays a popover with insights related to trends.

Figure 20:
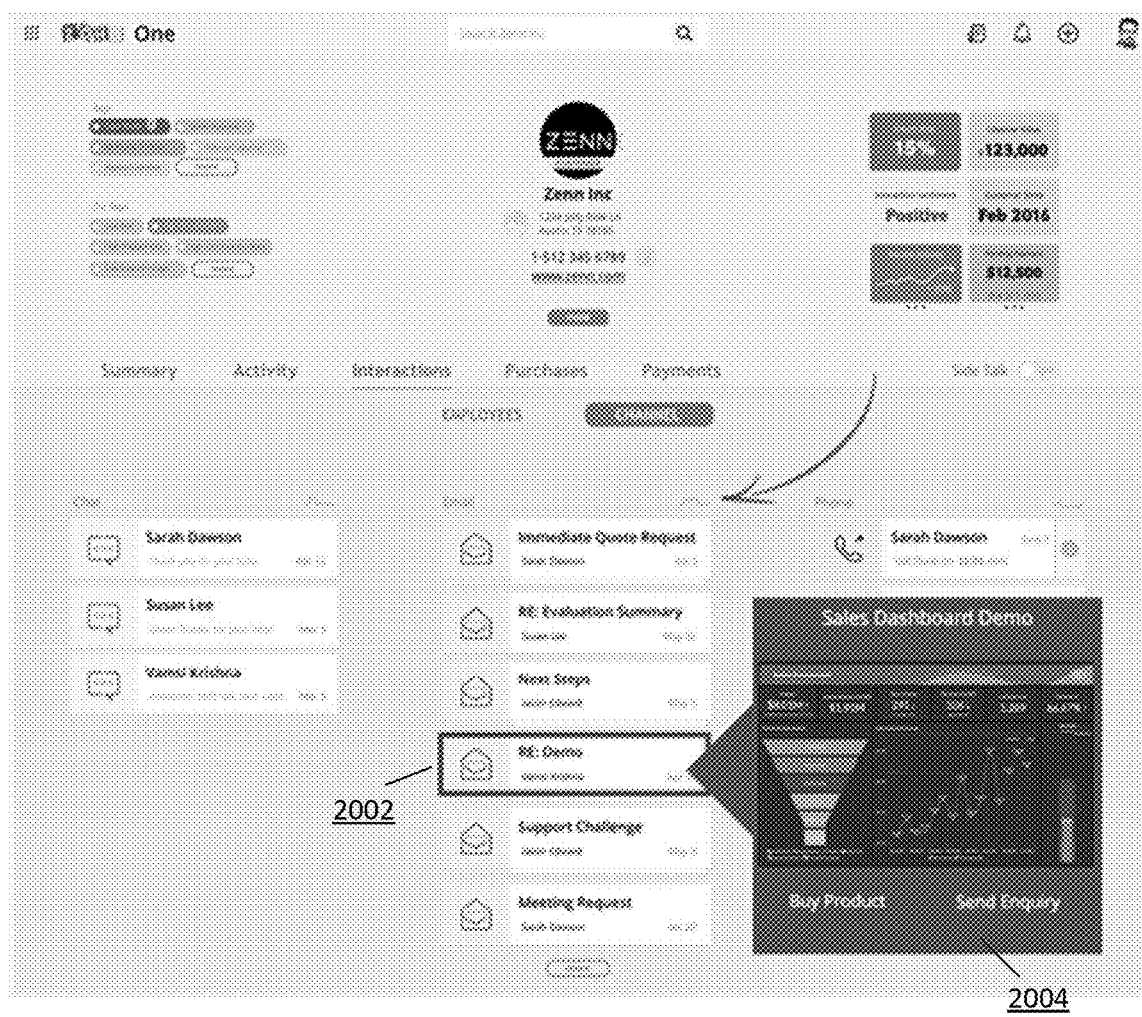
FIG. 20 depicts a screenshot of actionable popover of interactions.

FIG. 20 depicts a screenshot 2000 of actionable popover of interactions. A mouse over operation on a chat instance (2002 in the example of FIG. 20) causes a popover (2004 in the example of FIG. 20) of the chat related to "US Account Managers" group or individual contact to be displayed. The user can directly send a reply via popover. Response to an interaction instance can be made via popovers on interaction screen, thus avoiding navigation to a communication application separately.

In entity mode and in channel mode, the system enables features such as notifying reminders for an interaction instance using actionable popovers. As an example, FIG. 16 illustrates an email interaction instance related to evaluation summary between John Doe, Susan Lee and Sarah Dawson. A reminder for task completion is preset for this email interaction instance by any of the contact entity involved in the interaction. A mouse over on the email interaction card causes popover of a notification with a reminder to complete the task. The popovers provide a provision with a set of actions to complete the task. The set of actions include but are not limited to initiating a meeting request, sending a follow-up reminder, requesting for status updates, or the like.

FIG. 21 is a flowchart 2100 of an example of handling an actionable popover in a unified software suite. The flowchart 2100 starts at module 2102 with determining context of a human agent represented as a first entity in an organizational graph that includes a plurality of entities, including the first entity, at least conceptually as nodes connected to one another directly or indirectly via relationship edges. The context of the human agent can be selected from a time zone attributed to the human agent, a geographical location attributed to the human agent, a navigation pattern attributed to the human agent, personalization parameters of the first entity, preferential parameters of the first entity, privacy associated with the second entity, and a combination of these. The relationship edges can include a permission selected from hierarchy level of the first entity within an organization utilizing the unified software suite, a time zone attributed to the human agent, a geographical location attributed to the human agent, privacy associated with the second entity, and a combination of these. In a specific implementation, an access control engine determines access permissions of the first entity. In a specific implementation, the organization graph is maintained using a 3-tier architecture comprising a User Interface (UI) layer, a process layer, and a data layer. In a specific implementation, a contextualization engine determines the context of the human agent.

The flowchart 2100 continues to module 2104 with selecting a set of cards for display in an interaction screen based at least in part on a relationship of the first entity with a first set of entities of the plurality of entities and relationships between the first set of entities with one another, wherein cards of the set of cards are respectively associated with entities of the first set of entities.

The flowchart 2100 continues to module 2106 with determining one or more actions are available to the first entity in association with an interaction card of the set of cards.

The flowchart 2100 continues to module 2108 with providing the interaction screen with the set of cards, wherein at least one of the set of cards include an indication of at least one of the relationships between the first set of entities with one another and information about an interaction between at least two entities of the first set of entities. The interaction card can be selected from an email card, a chat card, an audio card, a video card, a meeting card, and a combination of these. In a specific implementation, the interaction card is a snapshot card or a live insight card. In a specific implementation, an entity interaction frequency indication is provided on the interaction screen in association with the interaction card. In a specific implementation, a trendline graph illustrates a recency of interaction trend.

In an alternative, the flowchart 2100 includes a module for determining connections between the second entity and multiple ones of the plurality of entities and providing to the interaction screen interaction cards involving the second entity corresponding to relationships with a second set of the plurality of entities, wherein the interaction cards with similar context are grouped into lists. In an alternative, the flowchart 2100 includes modules for mapping a data level identifier (ID) of a data item to a designated field on a design element template; generating a design element with a corresponding design level ID; mapping the design level ID of the design element to a UI level ID; and providing the design element with the UI level ID to the interaction screen. In a specific implementation, an entity interaction summary associated with the second entity is provided on the interaction screen in association with the interaction card.

In an alternative, the flowchart 2100 includes a module for representing the interaction card in a first column associated with a first communication channel used for an interaction between the at least two entities of the first set of entities, wherein a second one or more columns include interaction cards associated with second one or more communication channels. In an alternative, the flowchart 2100 includes a module for representing the interaction card in a first column associated with the first entity, wherein a second one or more columns include at least two contact cards that are respectfully associated with the at least two entities of the first set of entities. In an alternative, display structures such as rows, wheel-and-spoke, or the like, are used instead of columns.

The flowchart 2100 continues to module 2110 with, in response to a first input stimulus that serves to select the interaction card, which can be characterized as the selected card when selected, providing an actionable popover card that includes a first action of the one or more actions as a selectable first graphical element of the one or more graphical elements. In a specific implementation, the actionable popover includes details of an interaction instance associated with the interaction card. In a specific implementation, the actionable popover is provided in association with a preset reminder notification.

The flowchart 2100 continues to module 2112 with, in response to a second input stimulus that serves to select the first graphical element, carrying out a process, associated with the first action, that is executed by an artificial agent of a unified software suite, and that is either constrained by the relationship of the first entity with a second entity of the at least two entities associated with the selected card or constrained by the relationship of the first entity with a third entity associated with the action. In a specific implementation, the human agent experiences a uniform design regardless of whether the process is carried out by a first application or a second application of the unified software suite. In a specific implementation, the process includes providing a response to an interaction instance by the human agent to an agent of the second entity or the third entity while the interaction screen is displayed.

In an alternative, the flowchart 2100 includes a module for retrieving, via a contextualization engine and an access control engine, data items from a data layer that are mapped to the interaction card to provide the interaction card a card identification (ID) and User Interface (UI) level ID that are unique to the first entity of the plurality of entities. In an alternative, the flowchart 2100 includes a module for highlighting an interaction instance between the at least two entities of the first set of entities upon detection of a third input stimulus.

What is claimed is:

1. A method comprising:
    determining context of a human agent represented as a first entity in an organizational graph that includes a plurality of entities, including the first entity, at least conceptually as nodes connected to one another directly or indirectly via relationship edges;
    selecting a set of cards for display in an interaction screen based at least in part on a relationship of the first entity with a first set of entities of the plurality of entities and relationships between the first set of entities with one another, wherein cards of the set of cards are respectively associated with entities of the first set of entities;
    determining one or more actions are available to the first entity in association with an interaction card of the set of cards;
    providing the interaction screen with the set of cards, wherein at least one card of the set of cards includes an indication of at least one of the relationships between the first set of entities with one another and information about an interaction between at least two entities of the first set of entities;
    in response to a first input stimulus that serves to select the interaction card, which can be characterized as the selected card when selected, providing an actionable popover card that includes a first action of the one or more actions as a selectable first graphical element of the one or more graphical elements;
    in response to a second input stimulus that serves to select the first graphical element, carrying out a process, associated with the first action, that is executed by an artificial agent of a unified software suite, and that is either constrained by a relationship of the first entity with a second entity of the at least two entities associated with the selected card or constrained by a relationship of the first entity with a third entity associated with the action;
    as part of the process, retrieving, via a contextualization engine and an access control engine, data items from a data layer that are mapped to the interaction card to provide the interaction card a card identification (ID) and User Interface (UI) level ID that are unique to the first entity of the plurality of entities.

2. The method of claim 1, wherein the context of the human agent is selected from a group of context variables consisting of a time zone attributed to the human agent, a geographical location attributed to the human agent, a navigation pattern attributed to the human agent, personalization parameters of the first entity, preferential parameters of the first entity, privacy associated with the second entity, and a combination of these.

3. The method of claim 1, wherein the relationship edges include a permission selected from a group consisting of hierarchy level of the first entity within an organization utilizing the unified software suite, a time zone attributed to the human agent, a geographical location attributed to the human agent, privacy associated with the second entity, and a combination of these.

4. The method of claim 1, wherein the interaction card is selected from a group of cards consisting of an email card, a chat card, an audio card, a video card, a meeting card, and a combination of these.

5. The method of claim 1, wherein the interaction card includes a snapshot card.

6. The method of claim 1, wherein the interaction card includes a live insight card.

7. The method of claim 1, wherein the human agent experiences a uniform design regardless of whether the process is carried out by a first application or a second application of the unified software suite.

8. The method of claim 1, further comprising providing an organization graph maintained using a 3-tier architecture comprising a User Interface (UI) layer, a process layer, and a data layer.

9. The method of claim 1, further comprising determining, by the contextualization engine, the context of the human agent.

10. The method of claim 1, further comprising determining, by the access control engine, access permissions of the first entity.

11. The method of claim 1, further comprising determining connections between the second entity and multiple ones of the plurality of entities and providing to the interaction screen interaction cards involving the second entity corresponding to relationships with a second set of the plurality of entities, wherein the interaction cards with similar context are grouped into lists.

12. The method of claim 1, further comprising:
    mapping a data level ID of a data item to a designated field on a design element template;
    generating a design element with a corresponding design level ID;
    mapping the design level ID of the design element to a UI level ID;
    providing the design element with the UI level ID to the interaction screen.

13. The method of claim 1, further comprising providing instructions for representing the interaction card in a first column associated with a first communication channel used for an interaction between the at least two entities of the first set of entities, wherein a second one or more columns include interaction cards associated with second one or more communication channels.

14. The method of claim 1, further comprising providing instructions for representing the interaction card in a first column associated with the first entity, wherein a second one or more columns include at least two contact cards that are respectively associated with the at least two entities of the first set of entities.

15. The method of claim 1, further comprising providing instructions for highlighting an interaction instance between the at least two entities of the first set of entities upon detection of a third input stimulus.

16. The method of claim 1, further comprising providing an entity interaction frequency indication on the interaction screen in association with the interaction card.

17. The method of claim 1, further comprising providing a trendline graph that illustrates a recency of interaction trend.

18. The method of claim 1, wherein the actionable pop-over card includes details of an interaction instance associated with the interaction card.

19. The method of claim 1, wherein the actionable pop-over card is provided in association with a preset reminder notification.

20. The method of claim 1, further comprising providing a response to an interaction instance by the human agent to an agent of the second entity or the third entity while the interaction screen is displayed.

21. The method of claim 1, further comprising providing an entity interaction summary associated with the second entity on the interaction screen in association with the interaction card.

22. The method of claim 1, further comprising providing instructions for representing the interaction card in a first column associated with the first entity, wherein a second one or more columns include at least two contact cards that are respectively associated with the at least two entities of the first set of entities.

* * * * *